United States Patent
Kakishima et al.

(10) Patent No.: US 11,843,554 B2
(45) Date of Patent: Dec. 12, 2023

(54) USER EQUIPMENT AND TRANSMISSION AND RECEPTION POINT

(71) Applicant: NTT DOCOMO, INC., Tokyo (JP)

(72) Inventors: Yuichi Kakishima, Tokyo (JP); Chongning Na, Tokyo (JP); Satoshi Nagata, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/496,817

(22) PCT Filed: Mar. 22, 2018

(86) PCT No.: PCT/US2018/023779
§ 371 (c)(1),
(2) Date: Sep. 23, 2019

(87) PCT Pub. No.: WO2018/175728
PCT Pub. Date: Sep. 27, 2018

(65) Prior Publication Data
US 2020/0287677 A1 Sep. 10, 2020

Related U.S. Application Data

(60) Provisional application No. 62/475,677, filed on Mar. 23, 2017.

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0695* (2013.01); *H04B 7/088* (2013.01); *H04W 72/046* (2013.01)

(58) Field of Classification Search
None
See application file for complete search history.

(56) References Cited

U.S. PATENT DOCUMENTS

2013/0039345 A1* 2/2013 Kim ................. H04W 72/0413
370/332
2013/0040684 A1 2/2013 Yu et al.
(Continued)

FOREIGN PATENT DOCUMENTS

CN 103875190 A 6/2014
CN 103918196 A 7/2014
(Continued)

OTHER PUBLICATIONS

Office Action issued in the counterpart Japanese Patent Application No. 2019-552534, dated Nov. 10, 2020 (8 pages).
(Continued)

*Primary Examiner* — Alpus Hsu
*Assistant Examiner* — CamQuyen Thai
(74) *Attorney, Agent, or Firm* — Osha Bergman Watanabe & Burton LLP

(57) ABSTRACT

A user equipment (UE) is disclosed including a receiver that receives at least a reference signal (RS) transmitted using a first beam from a transmission and reception point (TRP), using at least a second beam, and a processor that determines the first beam paired with the second beam based on reception quality of the RSs. The UE further includes a transmitter that transmits feedback information indicating the determined first beam. The second beam is an omni-directional beam. The receiver receives, from the TRP, reception (Rx) beam designation information indicating an Rx beam to receive the RSs, and the second beam is the Rx beam.

6 Claims, 24 Drawing Sheets

(51) Int. Cl.
*H04B 7/08* (2006.01)
*H04W 72/044* (2023.01)

(56) References Cited

U.S. PATENT DOCUMENTS

| | | | |
|---|---|---|---|
| 2013/0072243 A1 | 3/2013 | Yu et al. | |
| 2013/0121185 A1* | 5/2013 | Li | H04W 24/10 370/252 |
| 2013/0223251 A1* | 8/2013 | Li | H04B 7/0619 370/252 |
| 2014/0328266 A1* | 11/2014 | Yu | H04L 5/0053 370/329 |
| 2015/0244432 A1 | 8/2015 | Wang | |
| 2015/0249929 A1 | 9/2015 | Irie et al. | |
| 2016/0119936 A1* | 4/2016 | Kim | H04W 72/005 370/329 |
| 2016/0150435 A1* | 5/2016 | Baek | H04W 16/28 370/252 |
| 2016/0295502 A1* | 10/2016 | Yoon | H04W 52/0216 |
| 2016/0323898 A1* | 11/2016 | Jo | H04W 72/048 |
| 2017/0005711 A1 | 1/2017 | Yu et al. | |
| 2017/0230093 A1 | 8/2017 | Yu et al. | |
| 2017/0288743 A1* | 10/2017 | Nam | H04B 7/0626 |
| 2018/0123648 A1* | 5/2018 | Nagaraja | H04B 17/15 |
| 2018/0242327 A1* | 8/2018 | Frenne | H04L 25/0204 |
| 2018/0249526 A1* | 8/2018 | Nagaraja | H04B 7/088 |
| 2019/0261329 A1* | 8/2019 | Park | H04L 5/0048 |
| 2019/0334599 A1* | 10/2019 | Davydov | H04L 5/0051 |
| 2019/0349915 A1* | 11/2019 | Ahn | H04L 5/0091 |
| 2020/0059290 A1* | 2/2020 | Pan | H04W 24/10 |
| 2021/0344397 A1* | 11/2021 | Lee | H04B 7/0626 |

FOREIGN PATENT DOCUMENTS

| | | |
|---|---|---|
| JP | 2014-529213 A | 10/2014 |
| JP | 2015-164271 A | 9/2015 |
| JP | 2016-529778 A | 9/2016 |

OTHER PUBLICATIONS

Huawei, HiSilicon; "Consideration on beam management RRM requirements"; 3GPP TSG-RAN WG4 Meeting #82, R4-1701369; Athens, Greece, Feb. 13-17, 2017 (5 pages).
International Preliminary Report on Patentability issued in the corresponding International Application No. PCT/US2018/023779, dated Sep. 24, 2019 (10 pages).
Ericsson; "Beam management principles"; 3GPP TSG-RAN WG1 #86bis, R1-1609754; Lisbon, Portugal; Oct. 10-14, 2016 (5 pages).
International Search Report issued in PCT/US2018/023779 dated Jul. 3, 2018 (3 pages).
Written Opinion of the International Searching Authority issued in PCT/US2018/023779 dated Jul. 3, 2018 (9 pages).
Intel Corporation; "On beam indication on control and data channel"; 3GPP TSG RAN WG1 #88, R1-1702200; Athens, Greece; Feb. 13-17, 2017 (4 pages).
Ericsson; "DL Beam management overview"; 3GPP TSG-RAN WG1 #87ah-NR, R1-1700763; Spokane, WA, USA; Jan. 16-20, 2017 (4 pages).
3GPP TS 36.211 V14.1.0; "3rd Generation Partnership Project; Technical Specification Group Radio Access Network; Evolved Universal Terrestrial Radio Access (E-UTRA); Physical channels and modulation (Release 14)"; Dec. 2016 (175 pages).
3GPP TS 36.213 V14.1.0; "3rd Generation Partnership Project; Technical Specification Group Radio Access Network; Evolved Universal Terrestrial Radio Access (E-UTRA); Physical layer procedures (Release 14)"; Dec. 2016 (415 pages).
Office Action issued in European Application No. 18716804.2; dated Apr. 14, 2021 (9 pages).
Office Action issued in the counterpart Japanese Patent Application No. 2019-552534, dated Jun. 15, 2021 (6 pages).
Office Action in counterpart Chinese Patent Application No. 201880034119.7 dated Aug. 8, 2022 (22 pages).
Vivo; "Discussion on beam management for NR MIMO"; 3GPP TSG RAN WG1 AH_NR Meeting, R1-1700274; Spokane, USA; Jan. 16-20, 2017 (7 pages).

* cited by examiner

| Beam Pair Link | TRP Beam | Beam Pair of TPR Beam |
|---|---|---|
| BPL #1 | TRP Beam #1 | UE Beam #1 |
| BPL #2 | TRP Beam #2 | UE Beam #2 |
| BPL #3 | TRP Beam #3 | UE Beam #2 |
| BPL #4 | TRP Beam #4 | UE Beam #2 |

| Beam Pair Link | UE Beam | Beam Pair of UE Beam |
|---|---|---|
| BPL #1 | UE Beam #1 | TRP Beam #1 |
| BPL #2 | UE Beam #2 | TRP Beam #3 |

| Time Domain (or Frequency Domain) | 1 | 2 | 3 | 4 |
|---|---|---|---|---|
| TRP Tx Beam | 1 | 2 | 3 | 4 |
| UE Rx Beam | 1 | 1 | 1 | 1 |

| Time Domain<br>( or Frequency Domain) | 1 | 2 | 3 | 4 |
|---|---|---|---|---|
| TRP Tx Beam | 1 | 2 | 3 | 4 |
| UE Rx Beam | 1 | 2 | 2 | 1 |

| Time Domain<br>( or Frequency Domain) | 1 | 2 |
|---|---|---|
| TRP Tx Beam | - | - |
| UE Rx Beam | 1 | 2 |

| Time Domain (or Frequency Domain) | 1 | 2 |
|---|---|---|
| TRP Tx Beam | 1 | 1 |
| UE Rx Beam | 1 | 2 |

(Digital Rx Beam Available)

| Time Domain (or Frequency Domain) | 1 | 2 | 3 | 4 |
|---|---|---|---|---|
| TRP Tx beam | 1 | 1 | 2 | 2 |
| UE Rx beam | 1, 2 | 1, 2 | 1, 2 | 1, 2 |

| Time Domain (or Frequency Domain) | 1 | 2 | 3 | 4 | 5 | 6 | 7 | 8 |
|---|---|---|---|---|---|---|---|---|
| UE Tx beam | 1 | 2 | 1 | 2 | 1 | 2 | 1 | 2 |
| TRP Rx beam | 1 | 1 | 2 | 2 | 3 | 3 | 4 | 4 |

(Digital Rx Beam Available)

| Time Domain (or Frequency Domain) | 1 | 2 |
|---|---|---|
| UE Tx beam | 1 | 1 |
| TRP Rx beam | 1, 2, 3, 4 | 1, 2, 3, 4 |

USER EQUIPMENT AND TRANSMISSION AND RECEPTION POINT

TECHNICAL FIELD

The present invention generally relates to a method of beam management in a wireless communication system including a transmission and reception point (TRP) and a user equipment (UE).

BACKGROUND

In Third Generation Partnership Project (3GPP), beam management and Channel State Information (CSI) acquisition schemes for New Radio (NR; fifth generation (5G) radio access technology) are being studied to achieve efficient precoding with massive antenna array. For a massive array system using narrow beams, it is fundamental that the beams at a transmission and reception point (TRP) and/or a user equipment (UE) are fully adjusted, which can be also called as beam management. For a massive array system using narrow beams, it is fundamental that the beams at a transmission and reception point (TRP) and a user equipment (UE) are fully aligned to each other, which can be also called as beam pair link control.

In NR technologies, the UE performs beam management and CSI acquisition using Resource setting, CSI reporting setting, and Link.

Some of the contents for each parameters on CSI acquisition are listed as follows.

(1) Resource setting (Number of Resource setting: M)
  RS information (e.g., CSI-RS resource, the number of antenna ports)
  Interference measurement resource (IMR) information
  Time-domain behavior (periodic, aperiodic or semi-persistent), etc.
    Periodicity and timing offset for periodic and aperiodic
(2) CSI reporting setting (Number of CSI reporting setting: N)
  Time-domain behavior (periodic, aperiodic or semi-persistent)
  Frequency granularity (subband, partial band or wideband)
  CSI parameters (RI, PMI, CRI, CQI)
    Each CSI parameters are configured on/off
  CSI types (e.g., type I or II)
  Codebook information, etc.
(3) Link (Number of Links: 1)

The conventional technologies under legacy Long Term Evolution (LTE) (e.g., Rel. 13 LTE) do not support the aforementioned beam management and CSI acquisition schemes using beam pair link control. Furthermore, the beam pair link control is not defined and UE procedures using the beam pair control is not determined in the 3GPP standard.

CITATION LIST

Non-Patent Reference

[Non-Patent Reference 1] 3GPP, TS 36.211 V 14.1.0
[Non-Patent Reference 2] 3GPP, TS 36.213 V14.1.0

SUMMARY

One or more embodiments of the present invention relate to a user equipment (UE) that includes a receiver that receives one or more RSs transmitted using a first beam from a transmission and reception point (TRP), using at least a second beam, and a processor that determines the first beam paired with the second beam based on reception quality of the RSs.

One or more embodiments of the present invention relate to a TRP a receiver that receives at least a RS transmitted using a first beam from a UE, using at least a second beam; and a processor that determines the first beam paired with the second beam based on reception quality of the RSs.

One or more embodiments of the present invention relate to a UE that includes a processor that performs beam management using a beam pair link. The beam pair link is configured as association of a downlink reference signal (RS) and an uplink RS.

One or more embodiments of the present invention can perform efficient UE procedures using the beam pair control, which are further enhanced to accommodate much narrower beams compared to legacy systems.

Other embodiments and advantages of the present invention will be recognized from the description and figures.

DETAILED DESCRIPTION

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
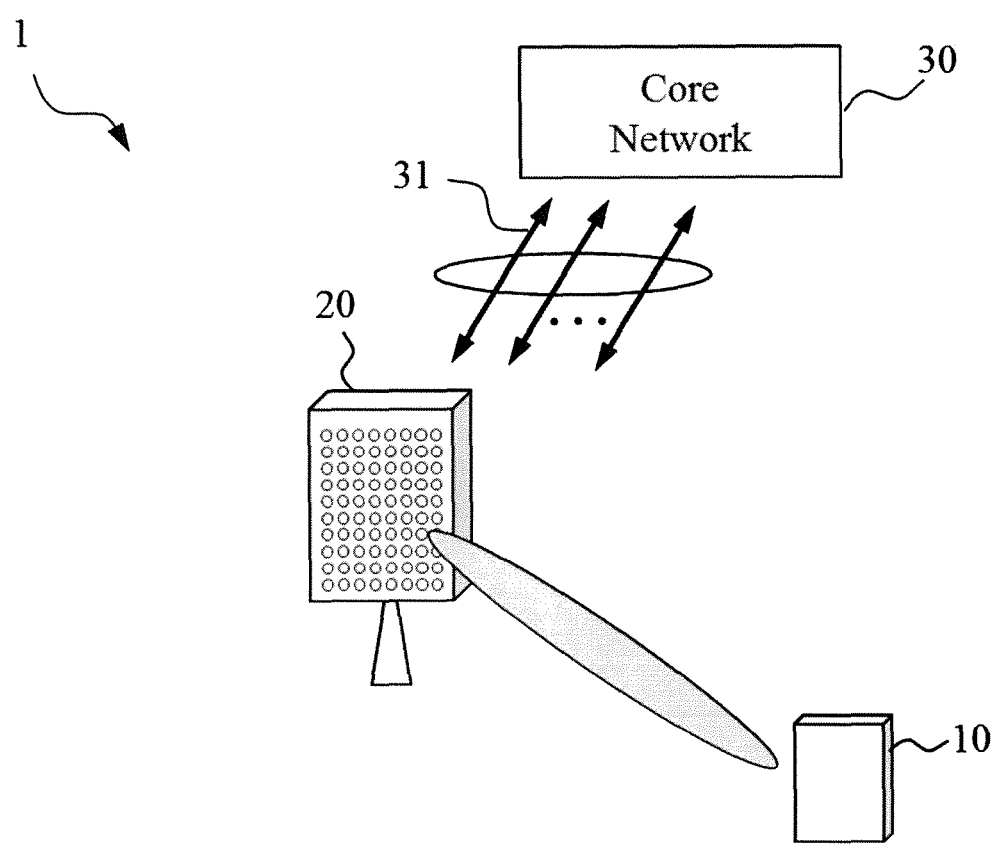
FIG. 1 is a diagram showing a configuration of a wireless communication system according to one or more embodiments of the present invention.

FIG. 1 is a wireless communications system 1 according to one or more embodiments of the present invention. The wireless communication system 1 includes a user equipment (UE) 10, a transmission and reception point (TRP) 20, and a core network 30. The wireless communication system 1 may be a New Radio (NR) system. The wireless communication system 1 is not limited to the specific configurations described herein and may be any type of wireless communication system such as an LTE/LTE-Advanced (LTE-A) system.

The TRP 20 may communicate uplink (UL) and downlink (DL) signals with the UE 10 in a cell of the TRP 20. The DL and UL signals may include control information and user data. The TRP 20 may communicate DL and UL signals with the core network 30 through backhaul links 31. The TRP 20 may be referred to as a base station (BS). The TRP 20 may be gNodeB (gNB).

The TRP 20 includes antennas, a communication interface to communicate with an adjacent TRP 20 (for example, X2 interface), a communication interface to communicate with the core network 30 (for example, S1 interface), and a CPU (Central Processing Unit) such as a processor or a circuit to process transmitted and received signals with the UE 10. Operations of the TRP 20 may be implemented by the processor processing or executing data and programs stored in a memory. However, the TRP 20 is not limited to the hardware configuration set forth above and may be realized by other appropriate hardware configurations as understood by those of ordinary skill in the art. Numerous TRPs 20 may be disposed so as to cover a broader service area of the wireless communication system 1.

The UE 10 may communicate DL and UL signals that include control information and user data with the TRP 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a RAM (Random Access Memory), a flash memory, and a radio communication device to transmit/receive radio signals to/from the TRP 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

(Indication of Beam Pair Link)

A beam pair link (BPL) is a combination of a TRP beam and a UE beam. The combination of the TRP beam and the UE beam includes a combination of a TRP transmission (Tx) beam and a UE reception (Rx) beam in downlink transmission and a combination of a TRP Rx beam and a UE Tx beam in uplink transmission. According to one or more embodiments of the present invention, the BPL may be indicated by association of Channel State Information Reference Signal (CSI-RS) resource and Sounding Reference Signal (SRS) resource. In other words, the BPL may be indicated by a combination of downlink and uplink reference signals (RSs).

Figure 2:
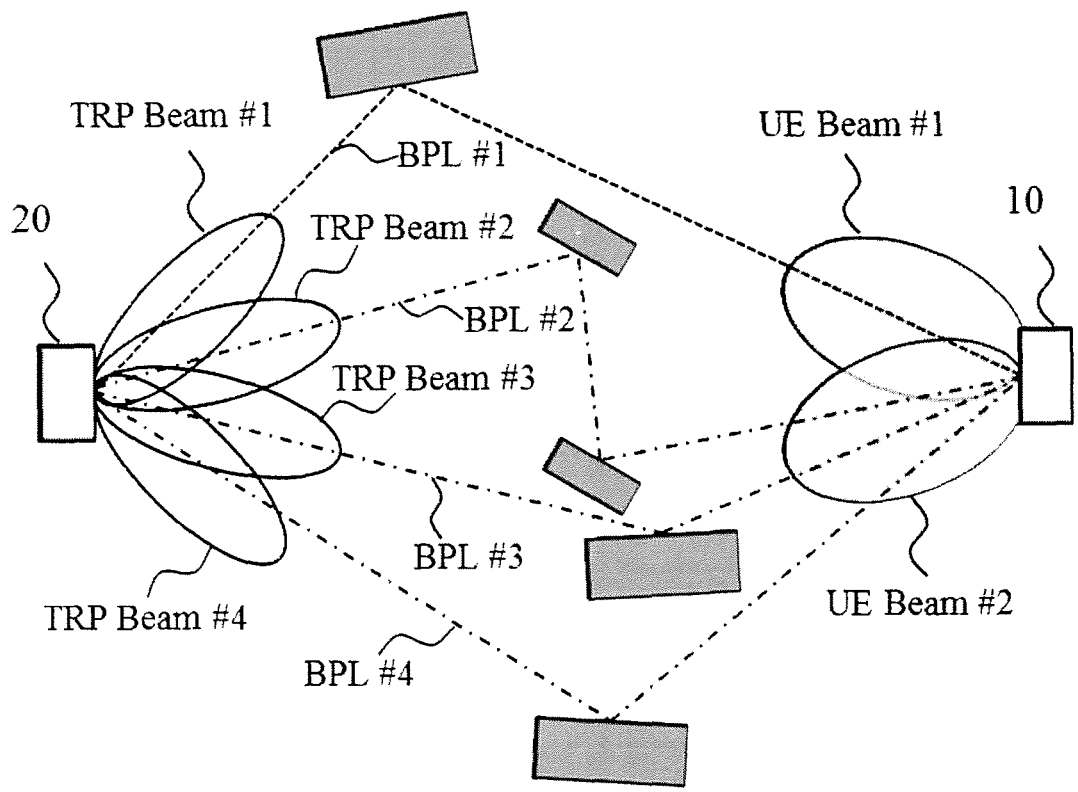
FIG. 2 is a diagram showing an example of a configuration of a beam pair link according to one or more embodiments of the present invention.
Figure 3:
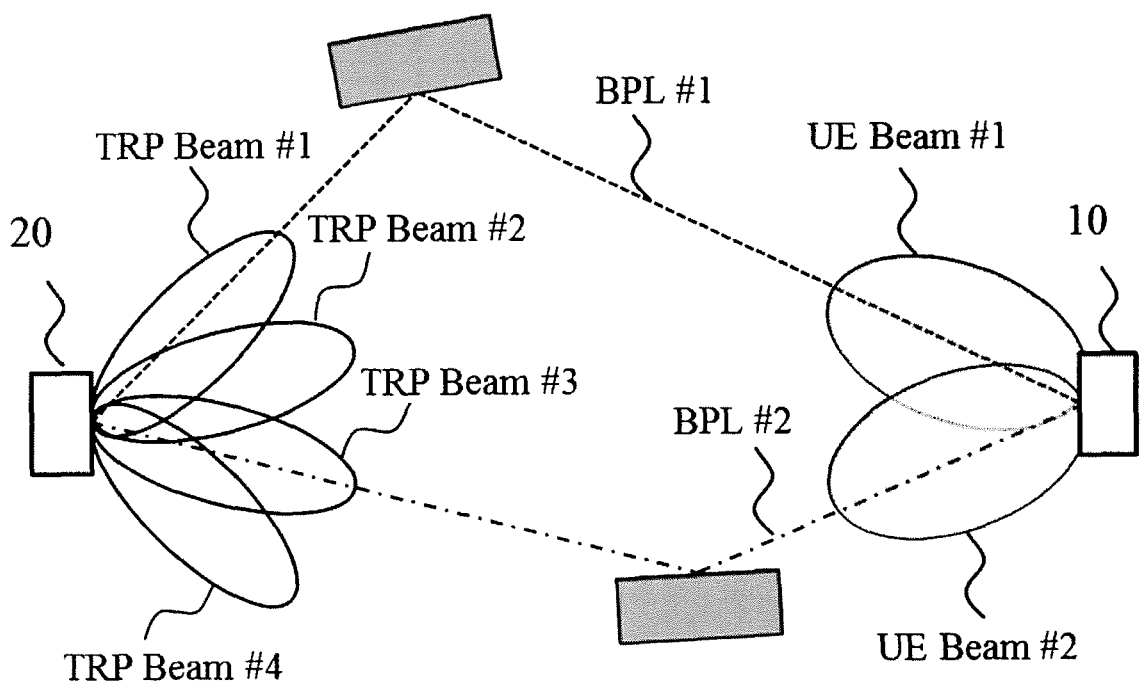
FIG. 3 is a diagram showing an example of a configuration of a beam pair link according to one or more embodiments of the present invention.

FIGS. 2 and 3 show configurations of BPLs according to one or more embodiments of the present invention. As shown in FIGS. 2 and 3, the TRP 20 uses four beams, TRP beams #1-#4, for signal transmission/reception. The UE 10 uses two beams, UE beams #1-#2, for signal transmission/reception.

In FIG. 2, the number of BPLs may be indicated as the number of TRP beams paired with the UE beam. Thus, in FIG. 2, the number of BPLs ($N_{TRP}$) is four (BPLs #1-4).

In FIG. 3, the number of BPLs may be indicated as the number of UE beams paired with the TRP beam. Thus, in FIG. 3, the number of BPLs ($N_{UE}$) is two (BPLs #1-2).

According to one or more embodiments of another example of the present invention, the number of BPLs may be indicated as a minimum value of the $N_{TRP}$ and $N_{UE}$ (min ($N_{TRP}$, $N_{UE}$)).

According to one or more embodiments of another example of the present invention, the number of BPLs may be indicated as a maximum value of the $N_{TRP}$ and $N_{UE}$ (max ($N_{TRP}$, $N_{UE}$)).

According to one or more embodiments of another example of the present invention, the number of BPLs may include the $N_{TRP}$ and $N_{UE}$ ($N_{TRP}+N_{UE}$).

According to one or more embodiments of another example of the present invention, the number of BPLs may be indicated as at least one of the $N_{TRP}$, $N_{UE}$, min ($N_{TRP}$, $N_{UE}$), max ($N_{TRP}$, $N_{UE}$), and $N_{TRP}+N_{UE}$.

(Beam Management for Beam Pair Link Determination)

A method to determine the BPL for the beam management will be described below.

(Method to Determine TRP Tx Beam)

Figure 4:
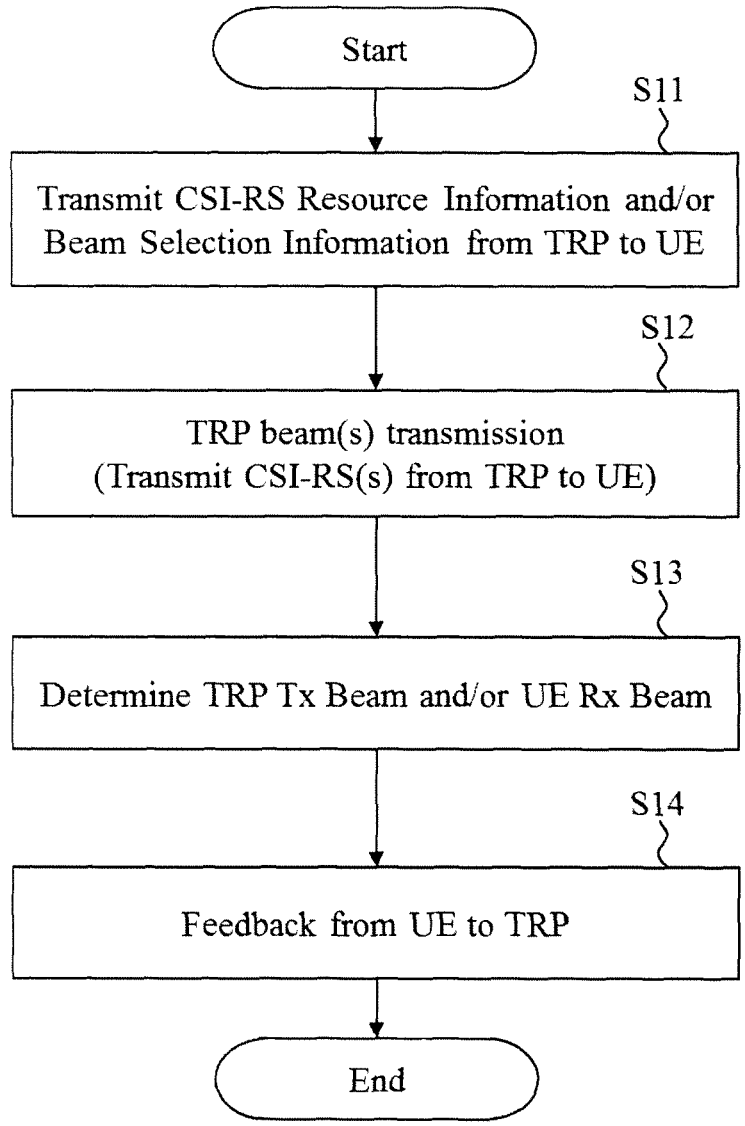
FIG. 4 is a flowchart showing an example of a beam management operation according to one or more embodiments of the present invention.

FIG. 4 is a flowchart showing an example of a beam management operation according to one or more embodiments of a first example of the present invention.

As shown in step S11, the TRP 20 may transmit CSI-RS resource information and/or beam selection information to the UE 10. The CSI-RS resource information includes information explicitly or implicitly indicating the number of CSI-RS resources transmitted from the TRP 20 (the number of TRP Tx beam $N_{TRP}$). For example, the beam selection information includes information indicating UE assumption for beam selection such as the number of selected beams.

For example, the TRP 20 may explicitly notify the UE 10 of the number of TRP Tx beam $N_{TRP}$ used for the CSI-RS transmission.

For example, the TRP 20 may implicitly notify the UE 10 of the number of TRP Tx beam $N_{TRP}$. For example, the TRP 20 may transmit the number of CSI-RS resources, the number of CSI-RS resource sets, a Beam ID that identifies each TRP Tx beam, or a virtual cell ID to notify the UE 10 of the number of TRP Tx beam $N_{TRP}$.

Furthermore, information indicating the number of TRP Tx beam $N_{TRP}$ may be set commonly or independently between transmission and reception. If $N_{TRP}$ is used for reception, it may mean the number of candidate Rx beams (or the number of Rx beams capable to be generated) at a TRP side.

At the step S11, the CSI-RS resource information includes information of the beam applied to the CSI-RS resource. For example, the TRP 20 may notify the UE 10 of precoding information as Quasi Co-Location (QCL). For example, the TRP 20 may notify the UE 10 of information indicating whether different precoding is applied to multiple CSI-RS resources (e.g., 1 bit information). For example, the TRP 20 may notify the UE 10 of information indicating whether the same precoding is applied to multiple CSI-RS resources (e.g., 1 bit information).

At step S12 in FIG. 4, the TRP 20 may transmit one or more TRP Tx beams (CSI-RS(s)) to the UE 10. The UE 10 may receive the TRP Tx beam(s) using the UE Rx beams.

At step S13, the UE 10 may determine the TRP Tx beam and/or UE Rx beam for the BPL.

At step S14, the UE 10 may transmit feedback information including information indicating the determined TRP Tx beam and/or UE Rx beam at the step S13.

Thus, according to one or more embodiments of the present invention, the TRP Tx beam used for the BPL can be determined. The methods to determine the BPL will be described in detail below.

First Example

Figure 5:
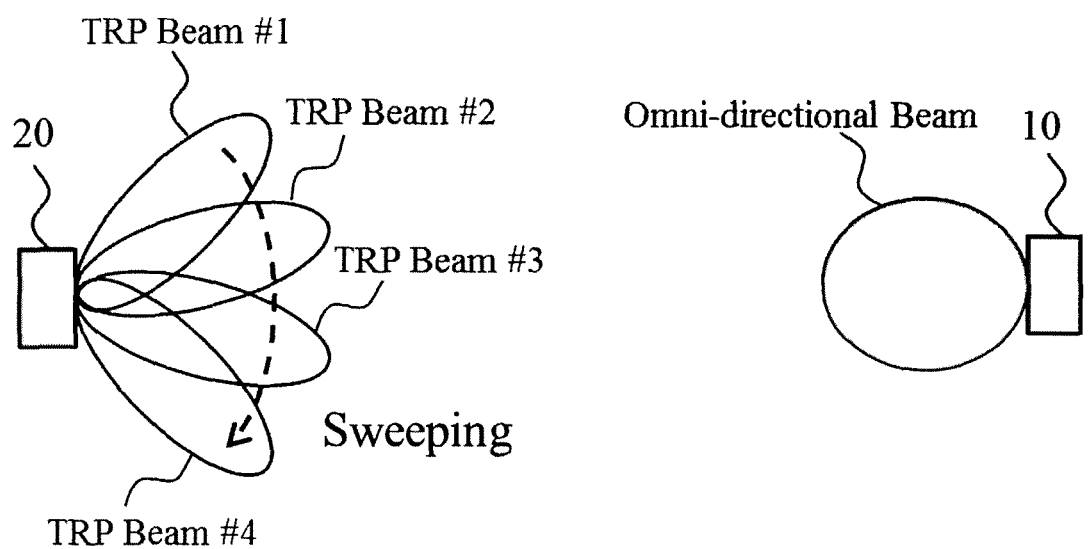
FIG. 5 is a schematic diagram showing an example of a beam management operation according to one or more embodiments of a first example of the present invention.

According to one or more embodiments of a first example of the present invention, in a TRP Tx beam determination operation, the UE 10 may receive the CSI-RSs using an omni-directional beam (omni-directional antenna). For example, the UE Rx beam may be determined at an antenna connector of the UE 10. As shown in FIG. 5, the TRP 20 may transmit the CSI-RSs using the TRP Tx beams #1-#4 by beam sweeping. The UE 10 may receive the CSI-RSs from the TRP 20 using the omni-directional beam.

Figure 6:
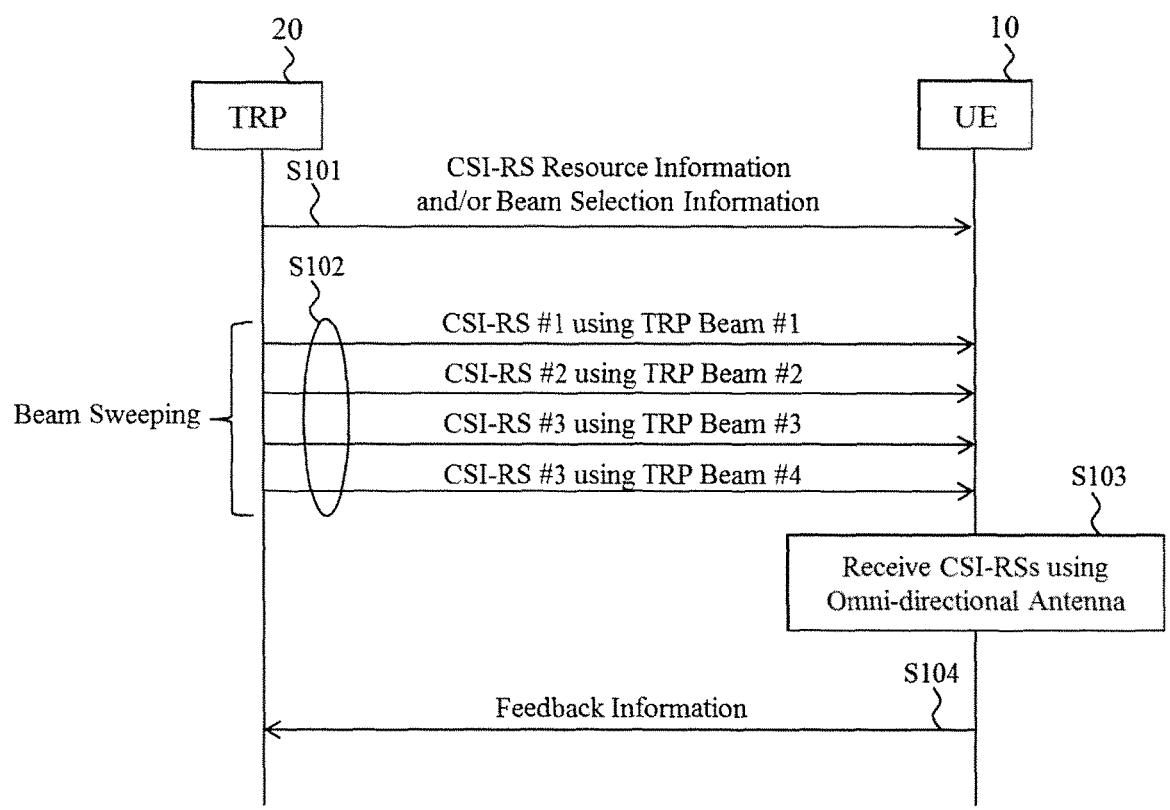
FIG. 6 is a sequence diagram showing an operation example of the beam management operation according to one or more embodiments of the first example of the present invention.

FIG. 6 is a sequence diagram showing an operation example of the beam management operation according to one or more embodiments of the first example of the present invention.

As shown in FIG. 6, at step S101, the TRP 20 may transmit the CSI-RS resource information and/or beam selection information. The CSI-RS resource information includes information indicating the number of TRP Tx beam $N_{TRP}$ and UE Rx beam designation information to designate the UE Rx beam. one or more embodiments of the first example of the present invention, the UE Rx beam designation information may be indicated as the omni-directional beam. For example, the UE Rx beam designation information may be informed as the QCL to designate the UE Rx beam as the omni-directional beam. For example, the UE Rx beam designation information may be informed that there is no QCL between the CSI-RS resource and SS/RS, to designate the UE Rx beam as the omni-directional beam. For example, the UE Rx beam designation information may be informed as a special case of Sounding Reference Signal (SRS) Resource Indicator (SRI).

At step S102, the TRP 20 may transmit the CSI-RS #1-#4 using the TRP Tx beam #1-#4, respectively, by beam sweeping.

At step S103, the UE 10 may receive the CSI-RSs using the omni-directional antenna (omni-directional beam) based on the UE Rx beam designation information. The UE 10 may determine the TRP Tx beam based on reception quality of the CSI-RSs.

At step S104, the UE 10 may transmit feedback information to the TRP 20.

For example, the feedback information includes information indicating the determined TRP Tx beam (e.g., CSI-RS Resource Indicator (CRI)), the applied UE Rx beam (e.g., SRI), and beam reception quality (e.g., CSI, Reference Signal Received Power (RSRP), and Received Signal Strength Indicator (RSSI)). The applied UE Rx beam is a UE Rx beam corresponding to the determined TRP Tx beam. The information indicating the applied UE Rx beam (e.g., Rx beam index) may be included in CSI parameters. The RSRP and RSSI may be included in the CSI parameters.

Furthermore, the configuration information includes information indicating the number of the selected beam pairs (the number of paired information for feedback).

For example, the number of the selected beam pairs may be determined to be single.

For example, the number of the selected beam pairs may be determined based on the number of TRP Tx beams. For example, the feedback information includes the best UE Rx beam and/or the beam reception quality for each TRP Tx beam.

For example, the number of the selected beam pairs may be determined based on the number of UE Rx beams. For example, the feedback information includes the best TRP Tx beam and/or the beam reception quality for each UE Rx beam.

For example, the number of the selected beam pairs may be designated by the TRP 20. For example, when the beam pair is selected based on a best-M scheme, the TRP 20 may designate a value "M".

For example, the number of the selected beam pairs may be determined by the UE 10.

Second Example

Figure 7:
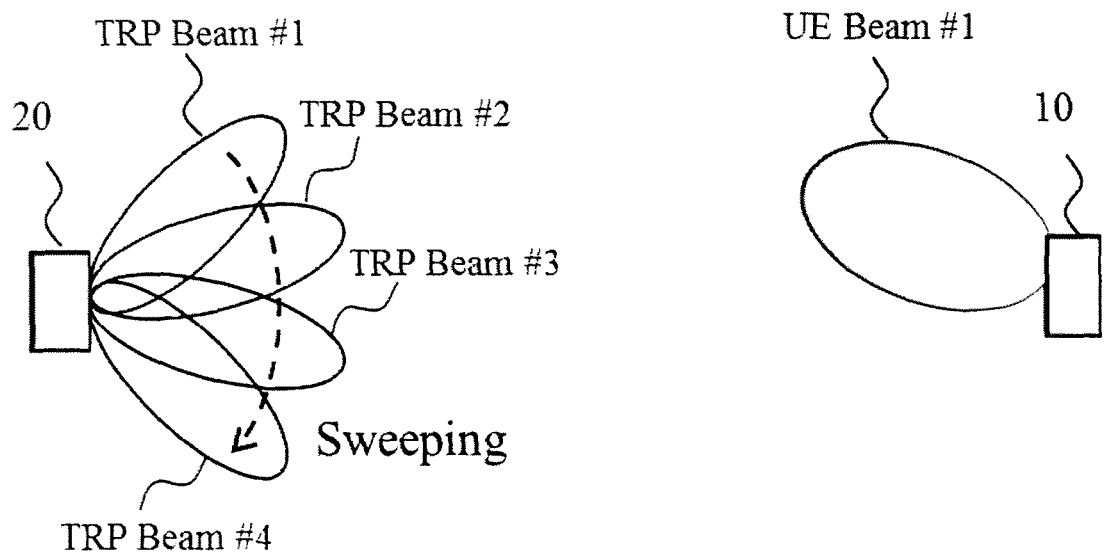
FIG. 7 is a schematic diagram showing an example of a beam management operation according to one or more embodiments of a second example of the present invention.

According to one or more embodiments of a second example of the present invention, in a TRP Tx beam determination operation, the UE 10 may receive the CSI-RSs using a predetermined UE Rx beam (Rx antenna panel or Rx antenna group). The predetermined UE Rx beam may be designated by the TRP 20 or determined by the UE 10. The predetermined UE Rx beam may be at least one. As shown in FIG. 7, the TRP 20 may transmit the CSI-RSs using the TRP Tx beams #1-#4 by beam sweeping. The UE 10 may receive the CSI-RSs from the TRP 20 using the UE Rx beam #1.

Figure 8:
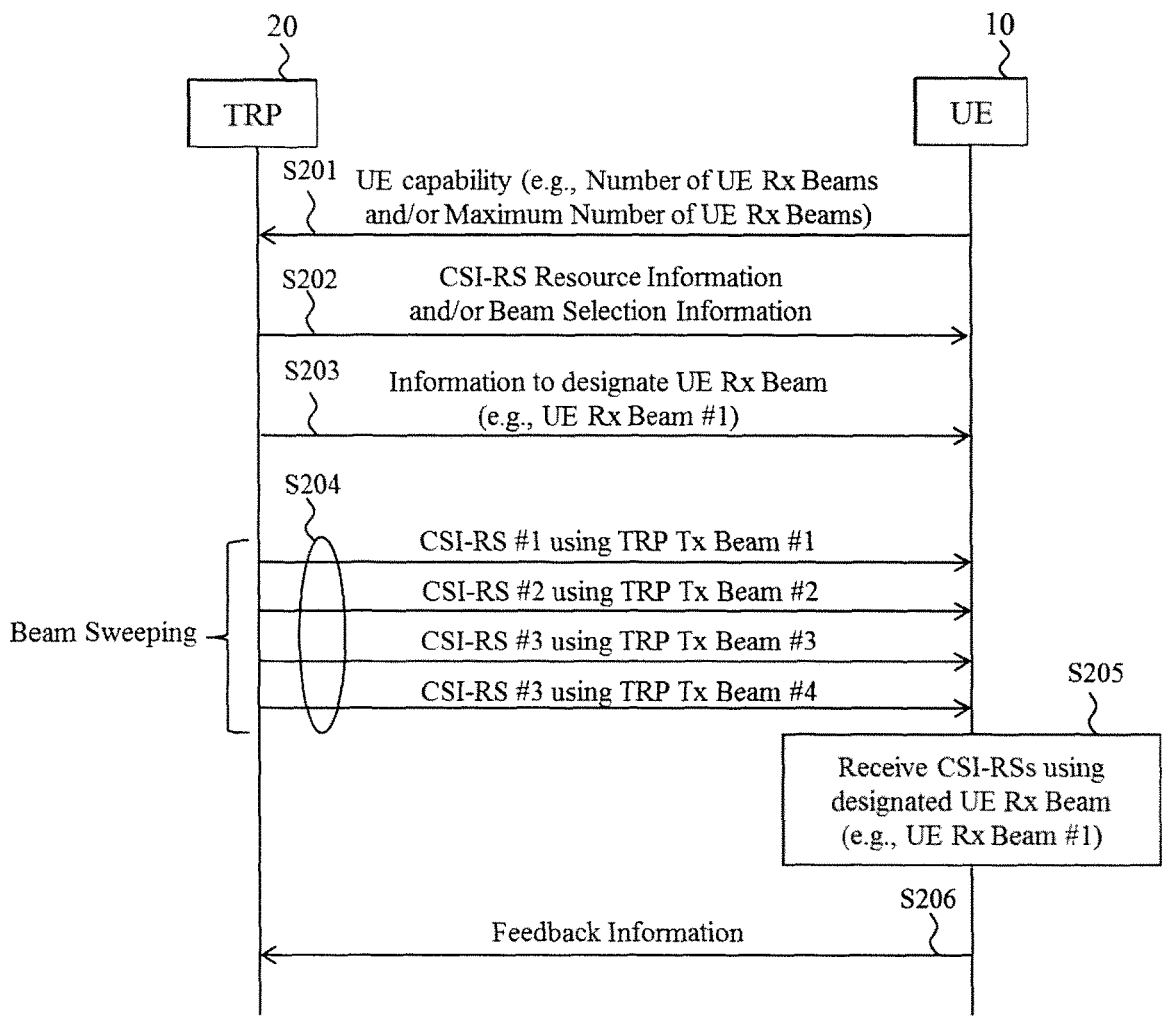
FIG. 8 is a sequence diagram showing an operation example of the beam management operation according to one or more embodiments of the second example of the present invention.

FIG. 8 is a sequence diagram showing an operation example of the beam management operation according to one or more embodiments of the second example of the present invention.

As shown in FIG. 8, at step S201, the UE 10 may transmit UE capability information including UE Rx beam information. For example, the UE Rx beam information includes the number of UE Rx beams and/or the maximum number of UE Rx beams. For example, the UE Rx beam information includes information indicating candidates of the UE Rx beams associated with candidates of the TRP Rx beams. For example, all or part of TRP Tx beams may be common to the UE Rx beams.

For example, the number of UE Rx beams of the UE capability information may be common to Tx/Rx or different between Tx and Rx.

For example, the number of UE Rx beams of the UE capability information may be indicated as the number of UE Rx digital beams ($N_{UE, D}$) and the number of UE Rx analogue beams ($N_{UE, A}$) separately. For example, the number of UE Rx beams may be acknowledged as $N_{UE}$ (=$N_{UE, D} \times N_{UE, A}$) by the TRP 20.

Furthermore, the number of UE Rx beams may be included in other signals other than the UE capability information, e.g., implicitly signaled as the number of RS resources for mobility.

At step S202, the TRP 20 may transmit the CSI-RS resource information and/or beam selection information. The CSI-RS resource information includes information indicating the number of TRP Tx beam $N_{TRP}$ and UE Rx beam information to designate the UE Rx beam.

At step S203, the TRP 20 may transmit UE Rx beam designation information to designate the UE Rx beam (e.g., UE Rx beam #1).

For example, the designated UE Rx beam may be indicated as a Beam index or SRS resource index.

For example, the designated UE Rx beam may be notified to the UE 10 as a Precoding Matrix Indicator (PMI) such as an uplink PMI.

For example, the designated UE Rx beam may be indicated as an antenna panel index, an antenna group index, or a TXRU index.

For example, the UE Rx beam designation information includes information to instruct a fallback to the omni-directional beam.

For example, the designated UE Rx beam may be commonly or independently used to receive the multiple TRP Tx beams.

At step S204, the TRP 20 may transmit the CSI-RS #1-#4 using the TRP Tx beam #1-#4, respectively, by beam sweeping.

At step S205, the UE 10 may receive the CSI-RSs using the designated UE Rx beam (e.g., UE Rx beam #1) based on the UE Rx beam designation information. The UE 10 may determine the TRP Tx beam based on reception quality of the CSI-RSs.

At step S206, the UE 10 may transmit the feedback information to the TRP 20. The operation in the step S206 is the same as that in the step S104 in FIG. 6.

Second Modified Example

Figure 9:
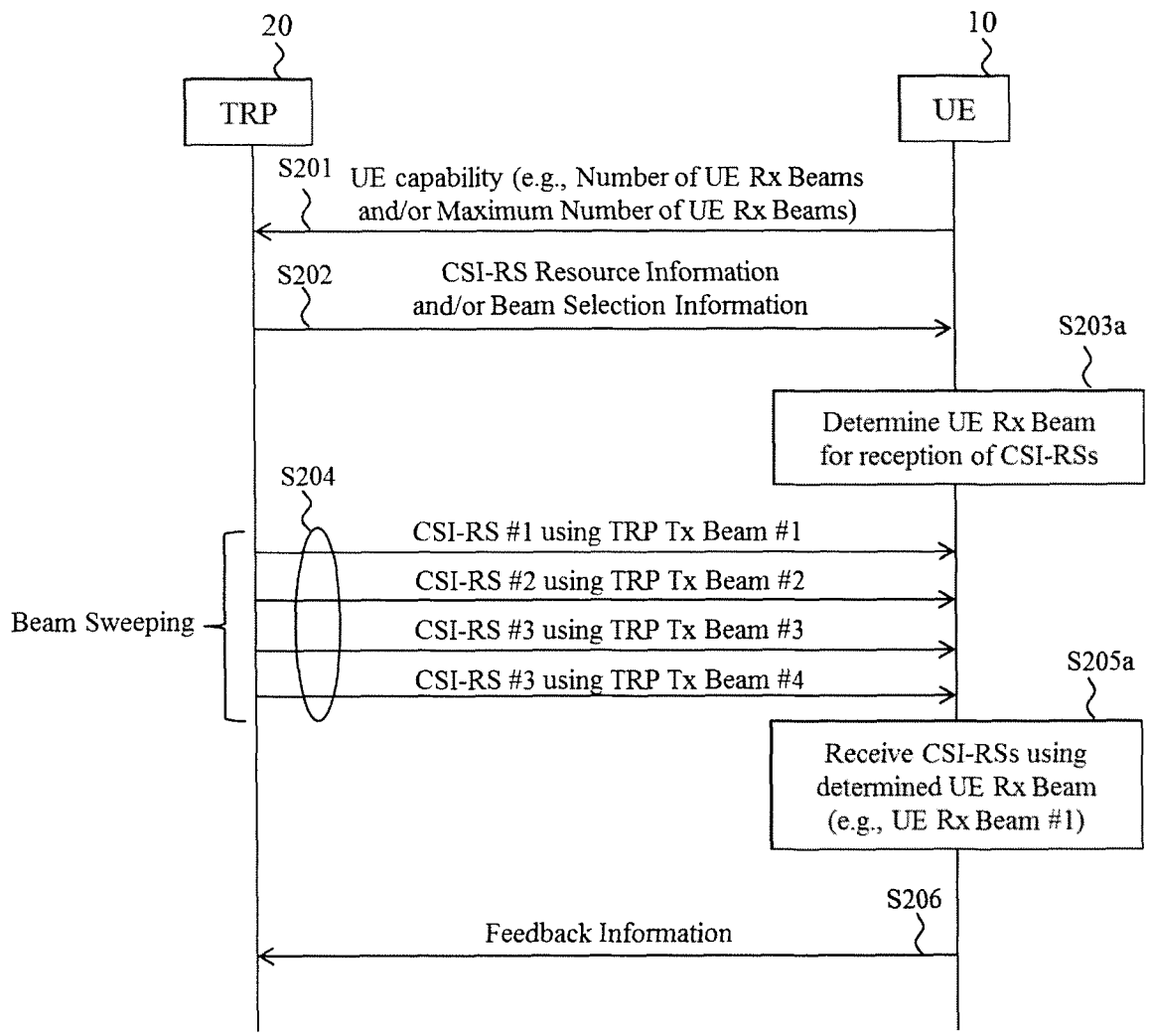
FIG. 9 is a sequence diagram showing an operation example of the beam management operation according to one or more embodiments of a second modified example of the present invention.

According to one or more embodiments of a second modified example of the present invention, the UE 10 may determine the UE Rx beam used to receive the CSI-RSs. FIG. 9 is a sequence diagram showing an operation example of the beam management operation according to one or more embodiments of the second modified example of the present invention. Similar steps in FIG. 9 to steps in FIG. 8 may have the same reference labels.

As shown in FIG. 9, at step S203*a*, the UE 10 may determine the UE Rx beam used to receive the CSI-RSs (e.g., UE Rx beam #1). Thus, according to one or more embodiments of the second modified example of the present invention, the UE Rx beam used to receive the CSI-RSs may be common to multiple TRP Tx beams.

For example, the UE 10 may not be allowed to switch the UE Rx beam for each TRP Tx beam.

For example, the UE Rx beam used to receive the CSI-RSs may be the same as the UE Rx beam used to receive predetermined physical channels and signals. Furthermore, association of the UE Rx beam used to receive predetermined physical channels and signals with the UE Rx beam used to receive the CSI-RSs may be signaled from the UE 10 to the TRP 20.

For example, the UE 10 may determine a fallback to the omni-directional beam.

For example, the UE 10 may determine the UE Rx beam used to receive the CSI-RSs based on QCL information from the TRP 20 and information on beam pair link. For example, the QCL information may be transmitted from the TRP 20 to the UE 10 for each TRP Tx beam or TRP Tx beam group. For example, the QCL information may be common to the TRP Tx beams.

For example, the UE 10 may determine the UE Rx beam used to receive the CSI-RSs based on Beam Index, e.g., CRI, from the TRP 20 and information on beam pair link. For example, the Beam index may be transmitted from the TRP 20 to the UE 10 for each TRP Tx beam or TRP Tx beam group. For example, the Beam Index may be common to the TRP Tx beams.

For example, all or part of the above methods to determine the UE Rx beam used to receive the CSI-RSs may be switched based on instructions from the TRP 20 or a core network. For example, when the determined UE Rx beam used to receive the CSI-RSs is not proper, the determined UE Rx beam may be changed to the omni-directional beam as a fallback because the proper TRP Tx beam may not be determined.

Third Example

Figure 10:
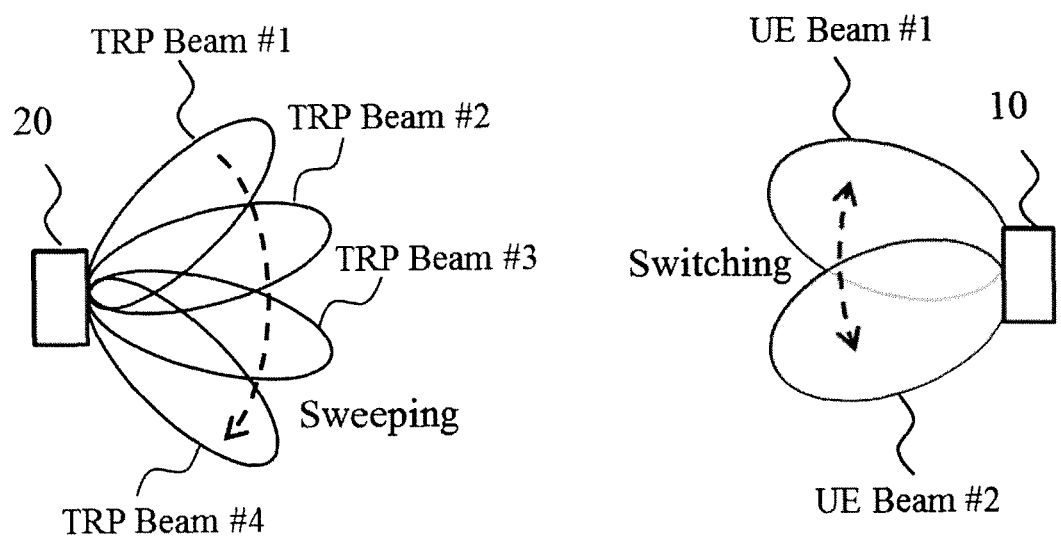
FIG. 10 is a schematic diagram showing an example of a beam management operation according to one or more embodiments of a third example of the present invention.

According to one or more embodiments of a third example of the present invention, in a TRP Tx beam determination operation, the UE 10 may receive the CSI-RSs using UE Rx beams switched for each TRP Tx beam. As shown in FIG. 10, the TRP 20 may transmit the CSI-RSs using the TRP Tx beams #1-#4 by beam sweeping. The UE 10 may receive the CSI-RSs from the TRP 20 using the UE Rx beams #1 and #2 by switching the UE Rx beams.

Figure 11:
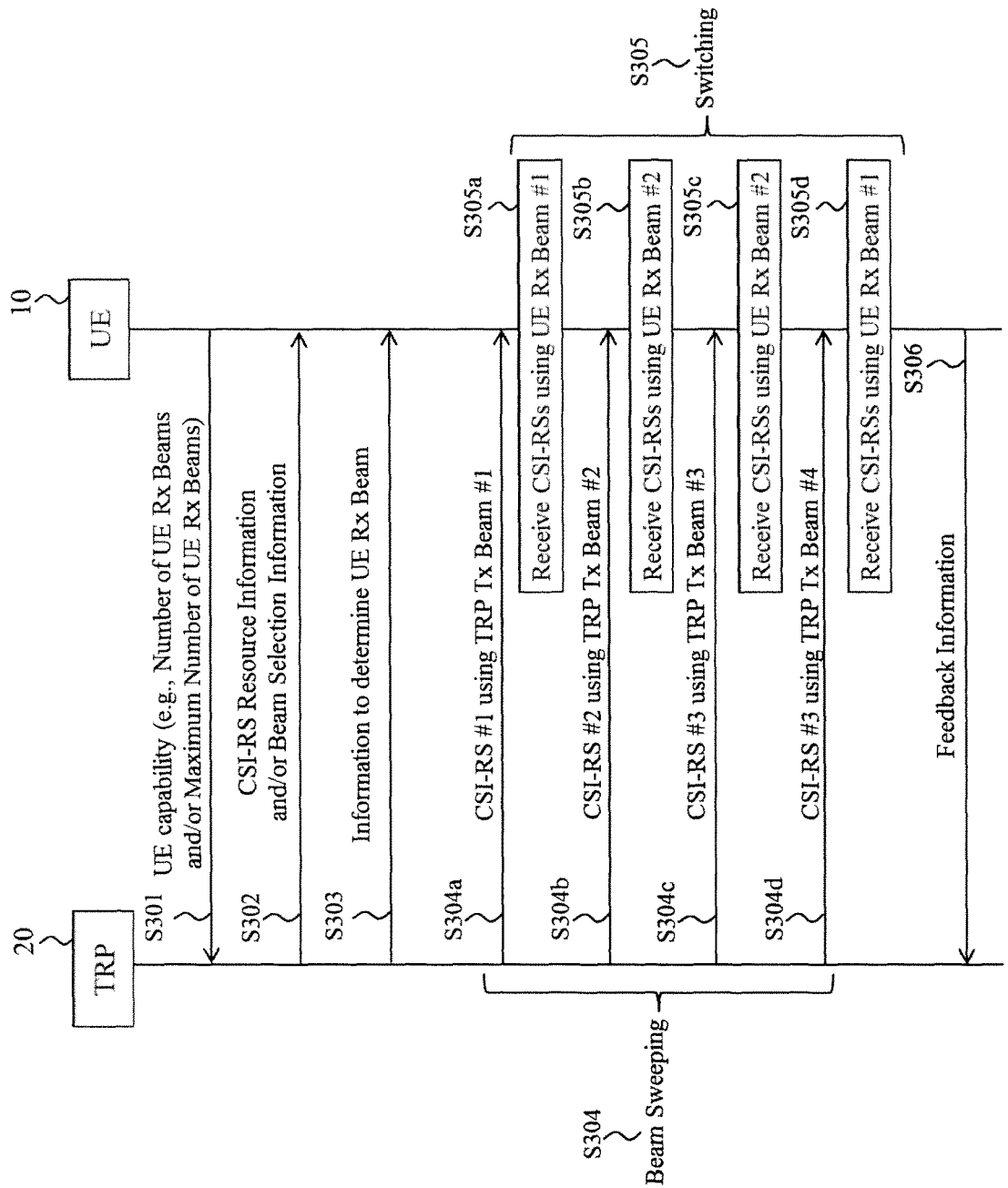
FIG. 11 is a sequence diagram showing an operation example of the beam management operation according to one or more embodiments of the third example of the present invention.

FIG. 11 is a sequence diagram showing an operation example of the beam management operation according to one or more embodiments of the third example of the present invention.

As shown in FIG. 11, at step S301, the UE 10 may transmit UE capability information including UE Rx beam information. For example, the UE Rx beam information includes the number of UE Rx beams and/or the maximum number of UE Rx beams. For example, the UE Rx beam information includes information indicating candidates of the UE Rx beams associated with candidates of the TRP Rx beams. For example, all or part of TRP Tx beams may be associated with the UE Rx beams.

Operations at steps S301 and S302 are the same as the operations at the steps S201 and S202, respectively.

At step S303, the TRP 20 may transmit information to determine the UE Rx beams for each TRP Tx beam.

At steps S304a-304d, the TRP 20 may transmit the CSI-RS #1-#4 using the TRP Tx beam #1-#4, respectively, by beam sweeping.

At steps S305a-305d, the UE 10 may receive the CSI-RSs using TRP Tx beams #1-#4, using UE Rx beam #1-#4, respectively, by switching the UE Rx beams. The UE 10 may determine the TRP Tx beam based on reception quality of the CSI-RSs.

An operation at step S306 is the same as the operations at the step S104 and at the step S206.

Third Modified Example

Figure 12:
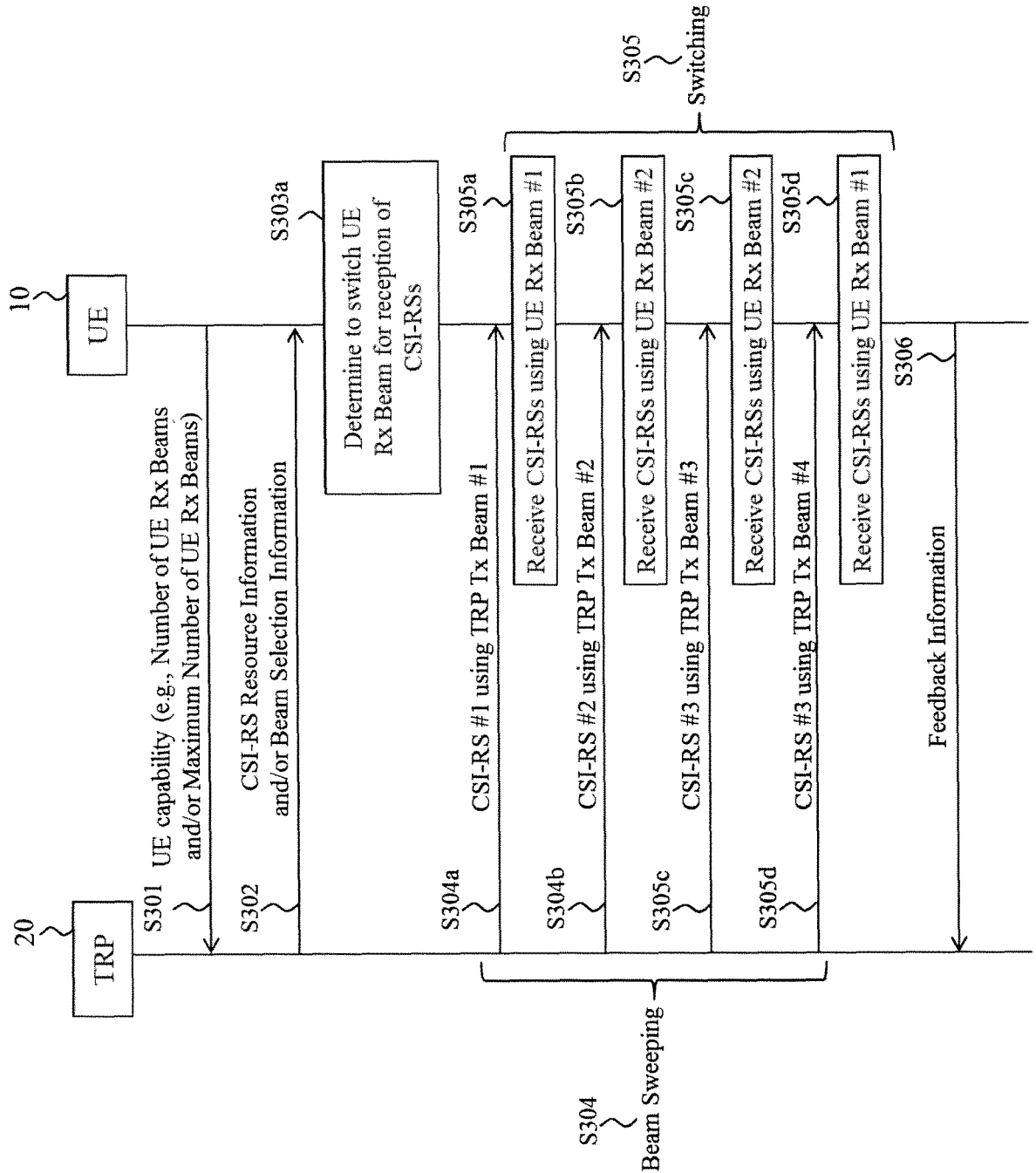
FIG. 12 is a sequence diagram showing an operation example of the beam management operation according to one or more embodiments of a third modified example of the present invention.

According to one or more embodiments of a third modified example of the present invention, the UE 10 may determine to switch the UE Rx beam used to receive the CSI-RSs. FIG. 12 is a sequence diagram showing an operation example of the beam management operation according to one or more embodiments of the third modified example of the present invention. Similar steps in FIG. 12 to steps in FIG. 11 may have the same reference labels.

As shown in FIG. 12, at step S303a, the UE 10 may determine to switch the UE Rx beam used to receive the CSI-RSs.

(Method to Determine UE Rx Beam)

Fourth Example

According to one or more embodiments of a fourth example of the present invention, to determine the UE Rx beam, the TRP 20 may transmit multiple CSI-RSs and the UE 10 may apply different UE Rx beam to each of the multiple CSI-RSs and select the best UE Rx beam.

Figure 13:
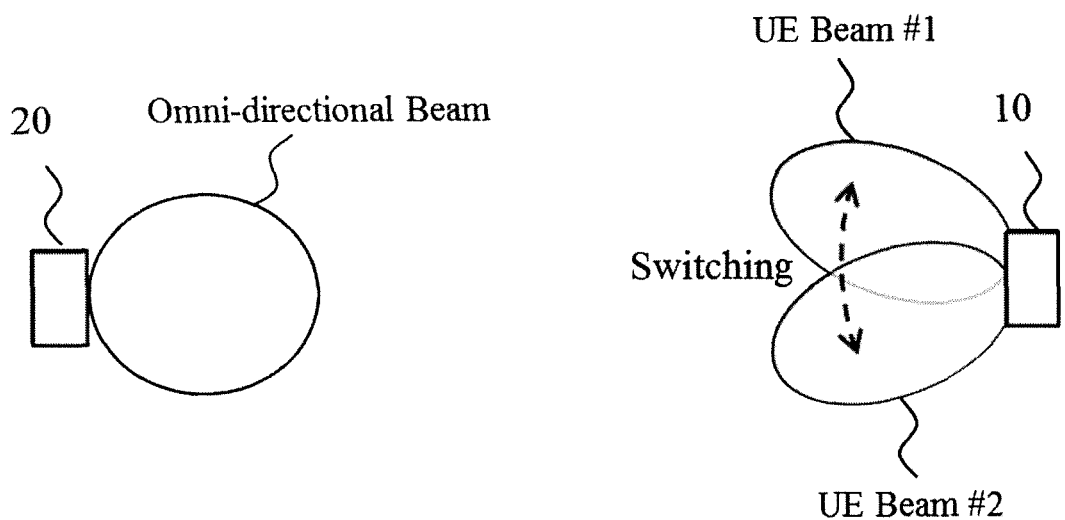
FIG. 13 is a schematic diagram showing an example of a beam management operation according to one or more embodiments of a fourth example of the present invention.

As shown in FIG. 13, the TRP 20 may transmit multiple CSI-RS using the omni-directional beam. Thus, the same beam may be applied to the multiple CSI-RSs.

Furthermore, when the UE 10 may perform digital sweeping, the multiple CSI-RS resources may not be necessary.

Furthermore, for example, the TRP 20 may transmit information of the beam applied to the CSI-RSs to the UE 10. The information of the applied beam may be notified to the UE 10 as the CRI or QCL.

Turning to FIG. 13, the UE 10 may receive the CSI-RSs using different UE Rx beam. Thus, the UE Rx beam applied to each CSI-RS may be different from each other. The UE 10 may determine the best UE Rx beam based on the reception quality of the received CSI-RSs.

For example, when the UE 10 may apply a digital beam, the number of CSI-RSs may be one.

For example, when the UE 10 may apply an analogue beam and a hybrid beam, the number of CSI-RSs may be the number of UE Rx analogue beams ($N_{UE, A}$).

For example, when the number of candidates of the UE Rx beams is large, the number of CSI-RSs used to determine the UE Rx beam may increase. Furthermore, when a plurality of UEs 10 use different UE Rx beams, the number of CSI-RSs may be different for each UE 10. As a result, the UE Rx beam may not be efficiently determined.

According to one or more embodiments of the fourth example of the present invention, the TRP 20 may limit candidates of the UE Rx beams. For example, the TRP 20 may designate the number of UE Rx beams.

For example, if the TRP 20 is able to designate the predetermined number of the UE Rx beams, operational flexibility is improved, but implementation of the UE 10 is complicated. According to one or more embodiments of the fourth example of the present invention, the predetermined number of the UE Rx beams may be limited. For example, the predetermined number of the UE Rx beams may be {1, 2, 4, 8, 16, 32}. For example, the predetermined number of the UE Rx beams may be the number of antenna panels and antennas of the UE 10. The TRP 20 may notify the UE 10 of the predetermined number of the UE Rx beams as an over sampling factor of the number of antenna panels and/or antennas of the UE 10. The TRP 20 may notify the UE 10 of the predetermined number of the UE Rx beams as an over sampling factor on the number which is derived by multiplying the number of antenna panels and antennas per panel of the UE 10.

Similarly, the TRP 20 may limit candidates of the UE Tx beams similar to the limitation of UE Rx beam candidates. The TRP 20 may designate the number of the UE Tx beams.

According to one or more embodiments of the fourth example of the present invention, the UE 10 may transmit feedback information including the UE Rx beam information and beam reception quality (e.g., CSI, RSRP, and RSSI).

The aforementioned technologies (e.g., notification of the number of Tx beams from the TRP 20 and the method to select multiple beams) in the method to determine the TRP Tx beam may be applied to technologies in the method to determine the UE Rx beam. At step S12, the TRP 20 may transmit, to the UE 10, periodic, aperiodic, and/or semi-persistent CSI-RS(s) in accordance with the information element designated in the RS setting.

Fourth Modified Example

Figure 14:
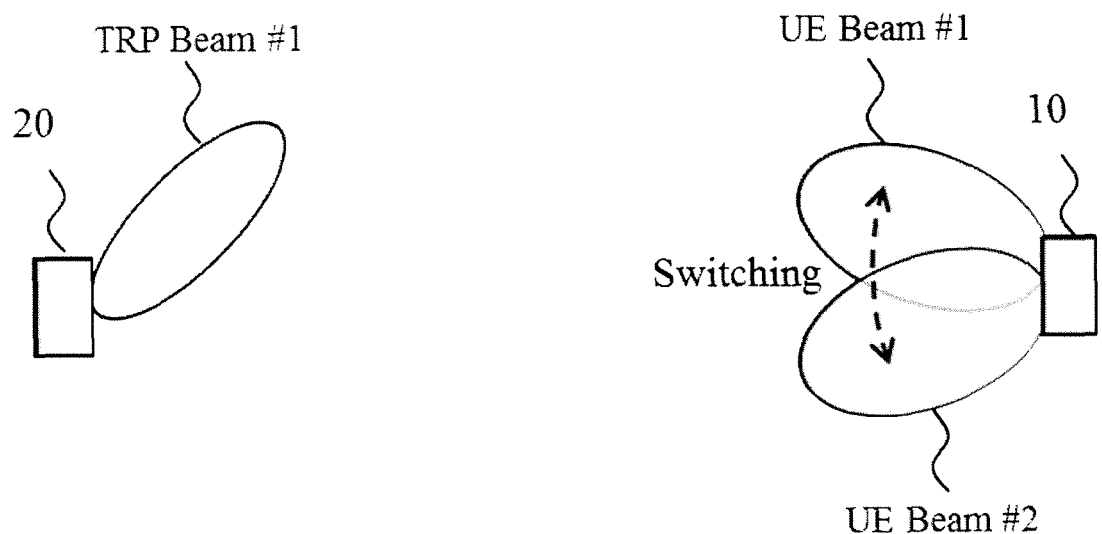
FIG. 14 is a schematic diagram showing an example of a beam management operation according to one or more embodiments of a fourth modified example of the present invention.

As shown in FIG. 14, according to one or more embodiments of a fourth modified example of the present invention, to determine the UE Rx beam, the TRP 20 may transmit multiple CSI-RSs using a single TRP Tx beam (TRP Tx beam #1). The UE 10 may receive the CSI-RSs using different UE Rx beam.

(Method to Determine TRP-UE Beam Pair)

In an initial access procedure, it is required to determine proper Tx/Rx beams without prior information. The beams to be determined are at most four patterns such as the TRP Tx beam, TRP Rx beam, UE Tx beam, and UE Rx beam. Depending on calibration accuracy of the UE 10, the common beam to Tx/Rx may be applied.

Fifth Example

Figure 15:
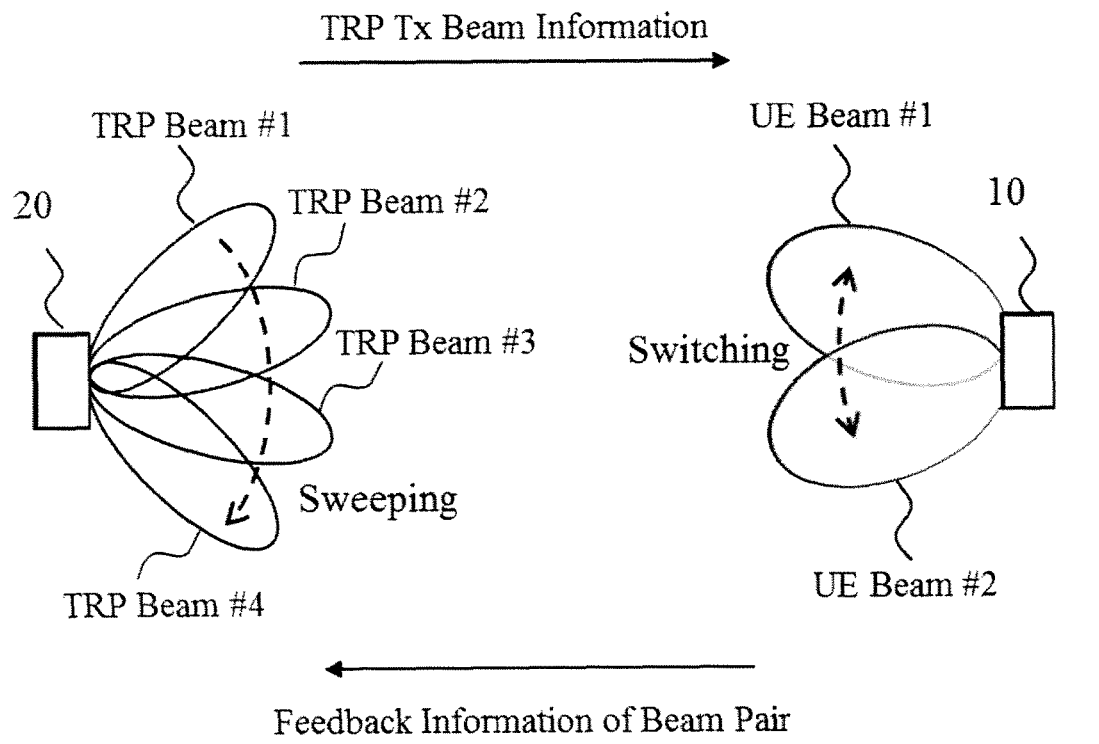
FIG. 15 is a schematic diagram showing an example of a beam sweeping operation according to one or more embodiments of a fifth example of the present invention.
Figure 16:
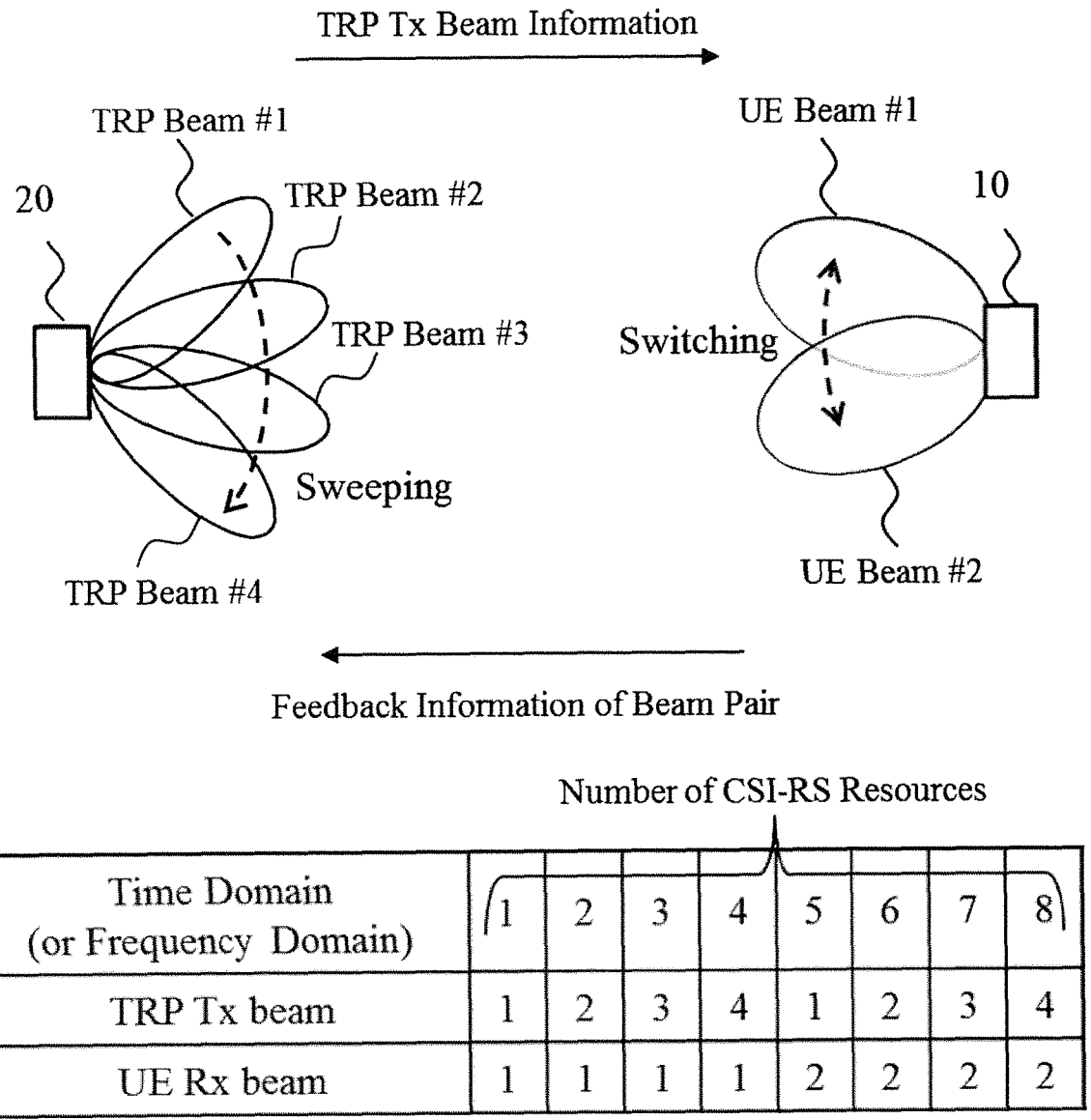
FIG. 16 is a schematic diagram showing an example of a beam sweeping operation according to one or more embodiments of a fifth example of the present invention.
Figure 17:
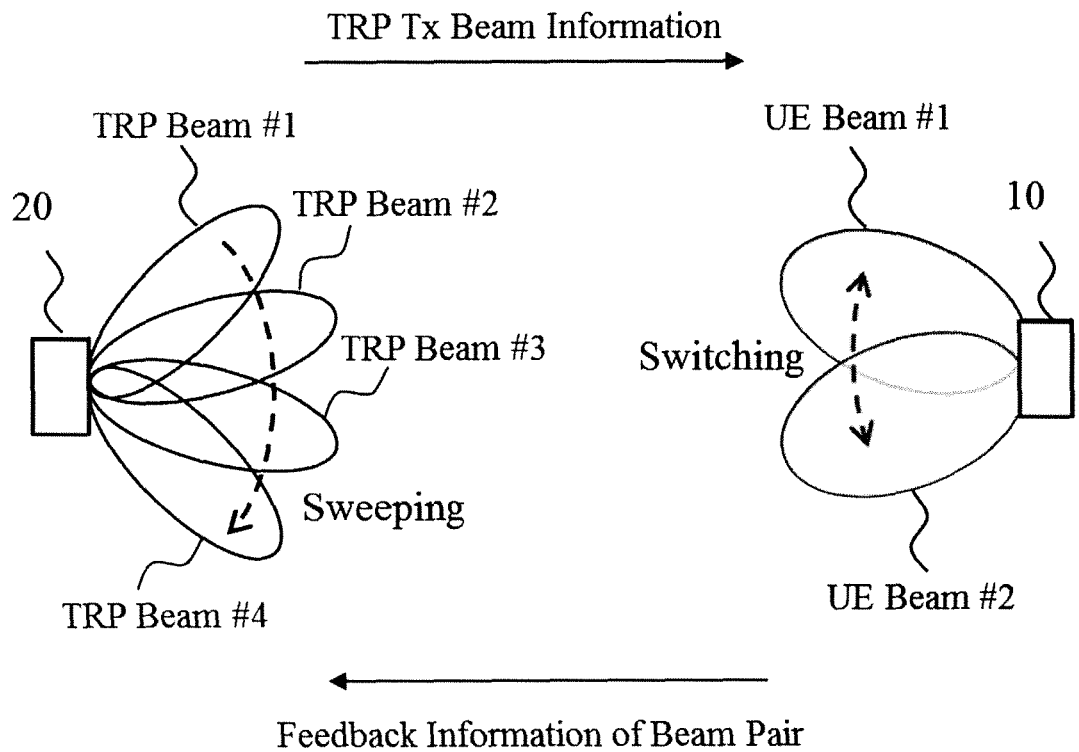
FIG. 17 is a schematic diagram showing an example of a beam sweeping operation according to one or more embodiments of a fifth example of the present invention.

FIGS. 15-17 are schematic diagrams showing an example of a beam sweeping operation according to one or more embodiments of a fifth example of the present invention. Operation examples in FIGS. 15-17 uses downlink reference signals, but similar operations may be applied to uplink reference signals.

According to one or more embodiments of the fifth example of the present invention, as shown FIGS. 15-17, to determine the TRP-UE beam pair, the TRP 20 may transmit TRP Tx beam information to the UE 10.

For example, the TRP Tx beam information includes the number of CSI-RS resources (Nall) transmitted from the TRP 20. In examples of FIGS. 15 and 16, Nall is 8.

For example, the TRP Tx beam information includes the number of TRP Tx beams (Nb) used for the CSI-RS transmission. In examples of FIGS. 15 and 16, Nb is 4.

For example, the TRP Tx beam information includes the number of repetition of CSI-RS transmission (Nr). In examples of FIGS. 15 and 16, Nr is 2.

According to one or more embodiments of the fifth example of the present invention, the TRP Tx beam information includes at least two of the number of CSI-RS resources (Nall), the number of TRP Tx beams (Nb), and the number of repetition of CSI-RS transmission (Nr) to configure sweeping information.

As shown in FIGS. 15-17, there are a plurality orders of beam transmission from the TRP 20. According to one or more embodiments of the fifth example of the present invention, the TRP 20 may transmit information of orders of beam sweeping to the UE 10. For example, the information of orders of beam sweeping indicates which of the TRP beam and the UE beam is the beam sweeping performed on first. For example, the information of orders of beam sweeping may be notified as the Beam index (CRI) or QCL information. Furthermore, the orders of beam sweeping may be defined in the specification such as 3GPP specification.

According to one or more embodiments of the fifth example of the present invention, as shown FIGS. 15-17, the UE 10 may transmit feedback information of the beam pair to the TRP 20.

For example, the feedback information of the beam pair includes a beam pair having the best reception quality. For example, the feedback information of the beam pair includes beam pairs having the best-M reception quality.

For example, the feedback information of the beam pair includes the best UE Rx beam for each TRP Tx beam.

For example, the feedback information of the beam pair includes the best TRP Tx beam for each UE Rx beam.

For example, the UE 10 may assume the different UE Rx beam for each TRP Tx beam. The feedback information of the beam pair includes the different UE Rx beam.

For example, the UE 10 may assume an omni-directional beam and a directional beam for each TRP Tx beam. The feedback information of the beam pair includes the assumed omni-directional beam and directional beam.

For example, the feedback information of the beam pair includes reception quality (e.g., CSI, RSRP, and/or RSSI) of the beam pair.

For example, the beam pair for feedback may be determined based on the CSI.

For example, the beam pair for feedback may be determined based on the RSRP and/or RSSI.

(Method to Determine Uplink Beam)

Although the technologies of the above examples are related to the methods to determine the downlink beam pair, the technologies may be applied to methods to determine an uplink beam pair.

(Method to Determine UE Tx Beam)

Sixth Example

Figure 18:
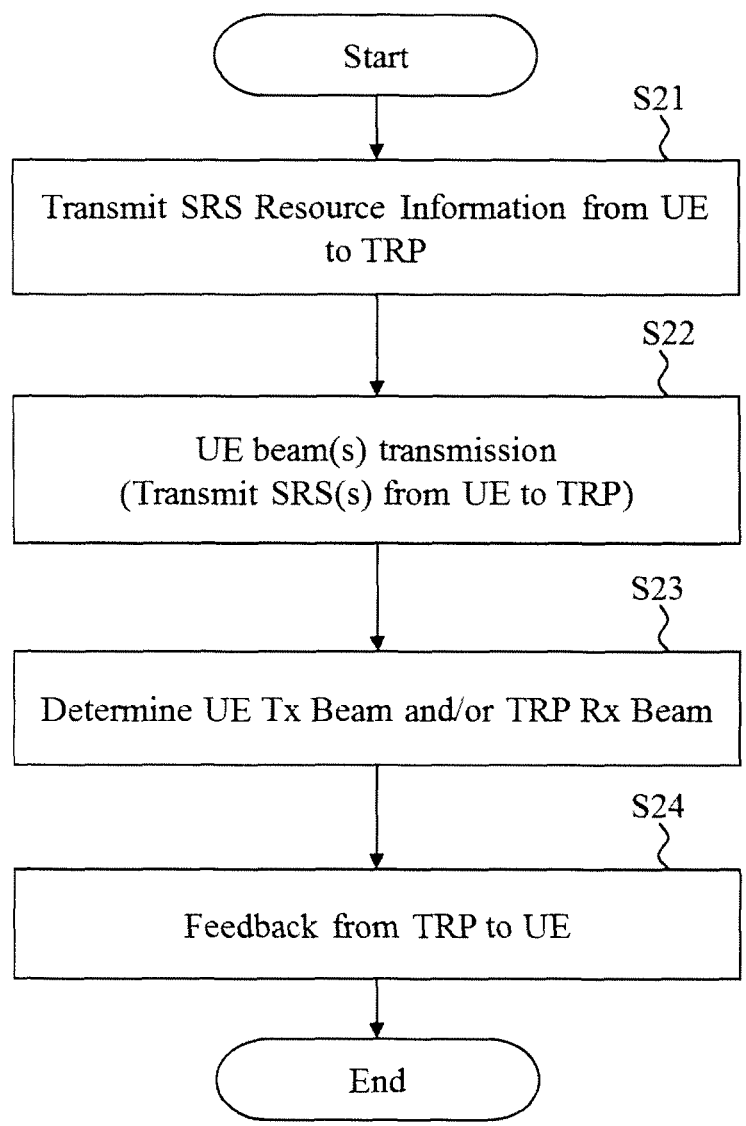
FIG. 18 is a flowchart showing an example of a method to determine UE Tx according to one or more embodiments of a sixth example of the present invention.

FIG. 18 is a flowchart showing an example of a method to determine UE Tx according to one or more embodiments of a sixth example of the present invention.

As shown FIG. 18, at step S21, the UE 10 may transmit SRS resource information to the TRP 200.

At step S22, the UE 10 may transmit one or more UE Tx beams (SRS(s)) to the TRP 20. The TPR 20 may receive the UE Tx beam(s) using the TPR Rx beams.

At step S23, the TRP 20 may determine the UE Tx beam and/or TRP Rx beam for the BPL.

At step S24, the TRP 20 may transmit feedback information including information indicating the determined UE Tx beam and/or TRP Rx beam at the step S23. For example, the information indicating the determined UE Tx beam may be SRS Resource Indicator (SRI).

Thus, according to one or more embodiments of the present invention, the UE Tx beam used for the BPL can be determined by the UE Tx beam sweeping and the TRP Rx beam switching.

(Method to Determine TRP Rx Beam)

Seventh Example

According to one or more embodiments of a seventh example of the present invention, to determine the TRP Rx beam, the UE 10 may transmit multiple SRSs and the TRP 20 may apply different TRP Rx beam to each of the multiple SRSs and select the best TRP Rx beam.

Figure 19:
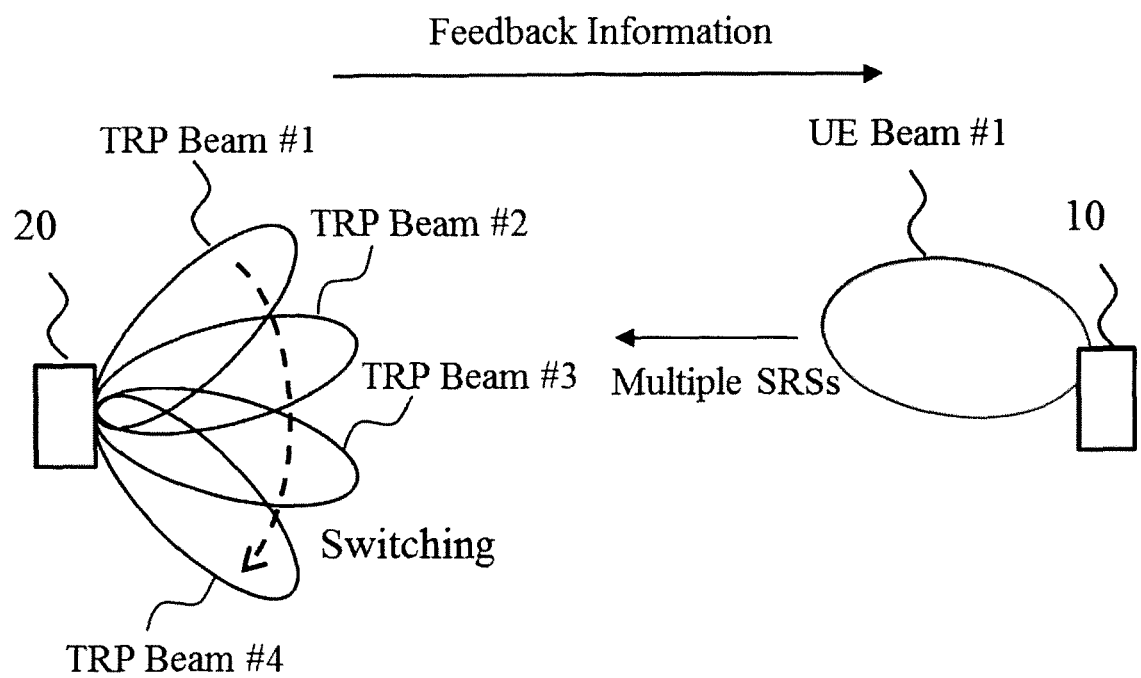
FIG. 19 is a schematic diagram showing an example of a method to determine TRP Tx according to one or more embodiments of a seventh example of the present invention.

As shown in FIG. 19, the UE 10 may transmit multiple SRSs (SRS resources) using a predetermine UE Tx beam (e.g., UE Tx beam #1). The same precoding may be applied to the multiple SRS resources. The UE Tx beam applied to the SRSs may be designated by the TRP 20 using the SRI. Furthermore, in FIG. 19, for example, the predetermine UE Tx beam the omni-directional beam.

The TRP 20 may switch the TRP Rx beams and receive the SRSs using the switched TRP Rx beam. The TRP 20 may determine the best TRP Rx beam based on the reception quality of the received SRSs.

Then, the TRP 20 may transmit feedback information to the UE 10. The feedback information includes information indicating the determined UE Tx beam and the TRP Tx beam corresponding to the determined UE Tx beam. Furthermore, the feedback information includes information indicating quality information of the determined UE Tx beam and the TRP Tx beam corresponding to the determined UE Tx beam.

(Method to Determine TRP-UE Beam Pair)

Eighth Example

Figure 20:
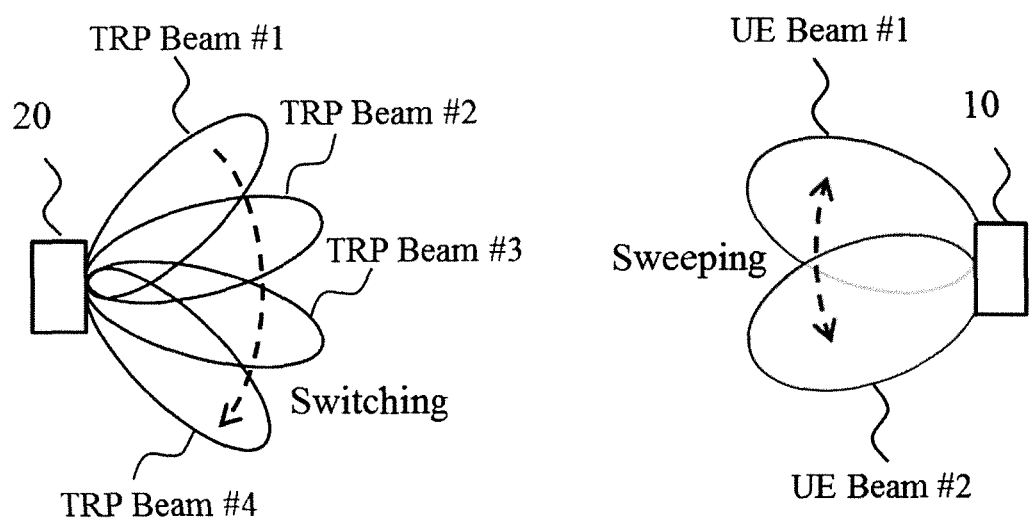
FIG. 20 is a schematic diagram showing an example of a beam sweeping operation according to one or more embodiments of an eighth example of the present invention.
Figure 21:
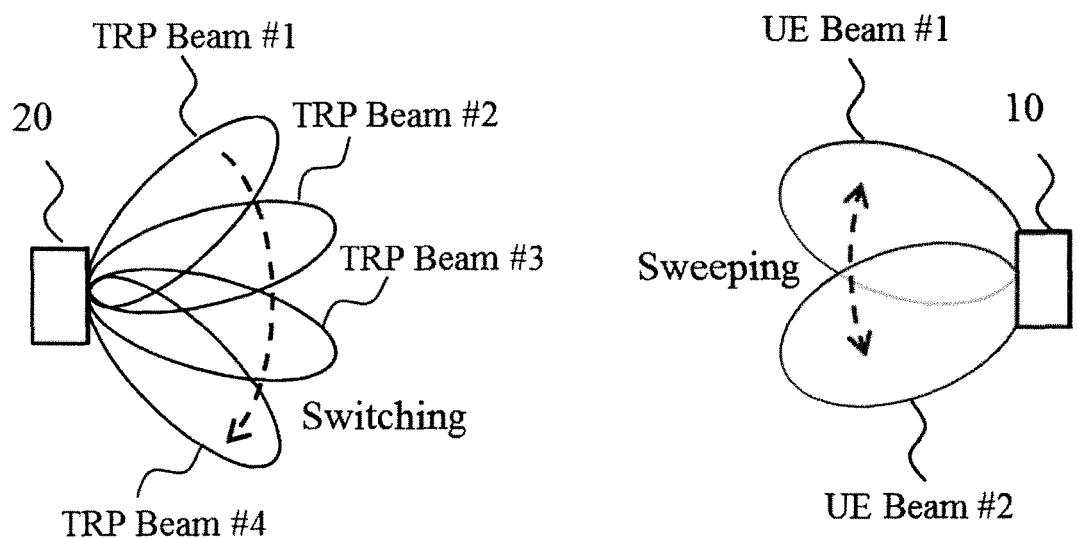
FIG. 21 is a schematic diagram showing an example of a beam sweeping operation according to one or more embodiments of an eighth example of the present invention.
Figure 22:
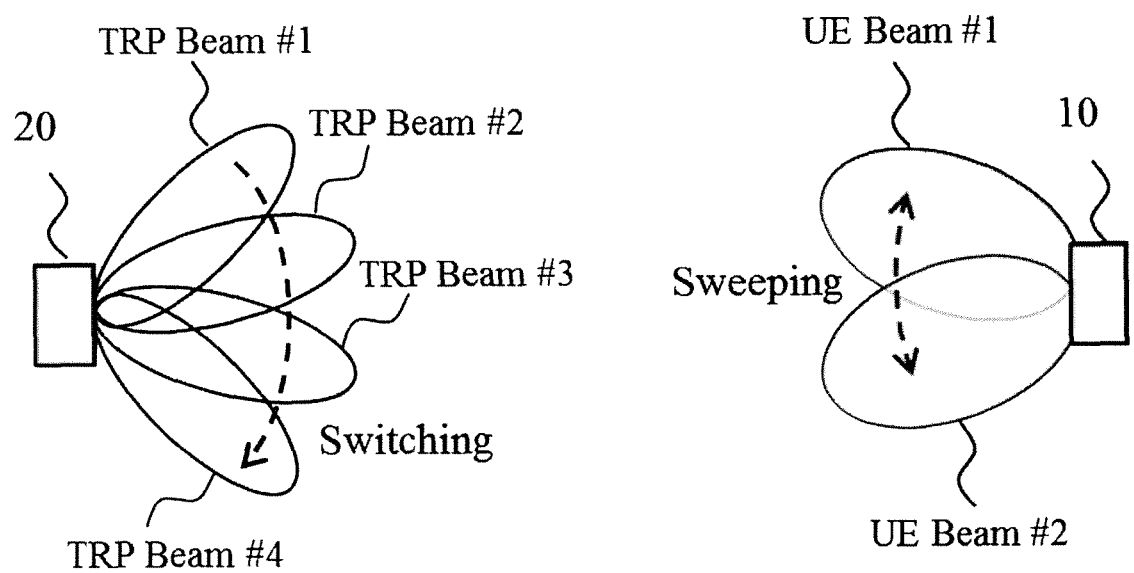
FIG. 22 is a schematic diagram showing an example of a beam sweeping operation according to one or more embodiments of an eighth example of the present invention.

FIGS. 20-22 are schematic diagrams showing an example of a beam sweeping operation according to one or more embodiments of an eighth example of the present invention. According to one or more embodiments of the fifth example of the present invention, as shown FIGS. 20-22, to determine the TRP-UE beam pair, the UE 20 may perform the UE Tx beam sweeping and transmit SRSs and the TRP 20 may perform the TRP Rx beam switching. For example, in FIG. 20-22, the TRP 20 may designate the UE Tx beam used for the SRS transmission.

Another Example

When there is no reciprocity of the uplink/downlink, a determined BPL in the downlink may be different from a determined BPL in the uplink. According to one or more embodiments of the present invention, the UE 10 may notify the TRP 20 of the determined BPL in the downlink and the UE 10 may notify the TRP 20 of the determined BPL in the uplink.

For example, when there are a lot of candidates of the TRP beams and the UE beams, the beam sweeping of all of the TRP beams and the UE beams may cause increase of a signaling overhead. According to one or more embodiments of the present invention, oversampling may be applied to the candidates of the TRP and/or UE beams. For example, oversampling may be applied to the candidates of the TRP and UE beams having odd (or even) numbers (Beam index). According to one or more embodiments of the present invention, a beam group for the TRP and/or UE beams used for the beam sweeping may be set.

(Configuration of TRP)

Figure 23:
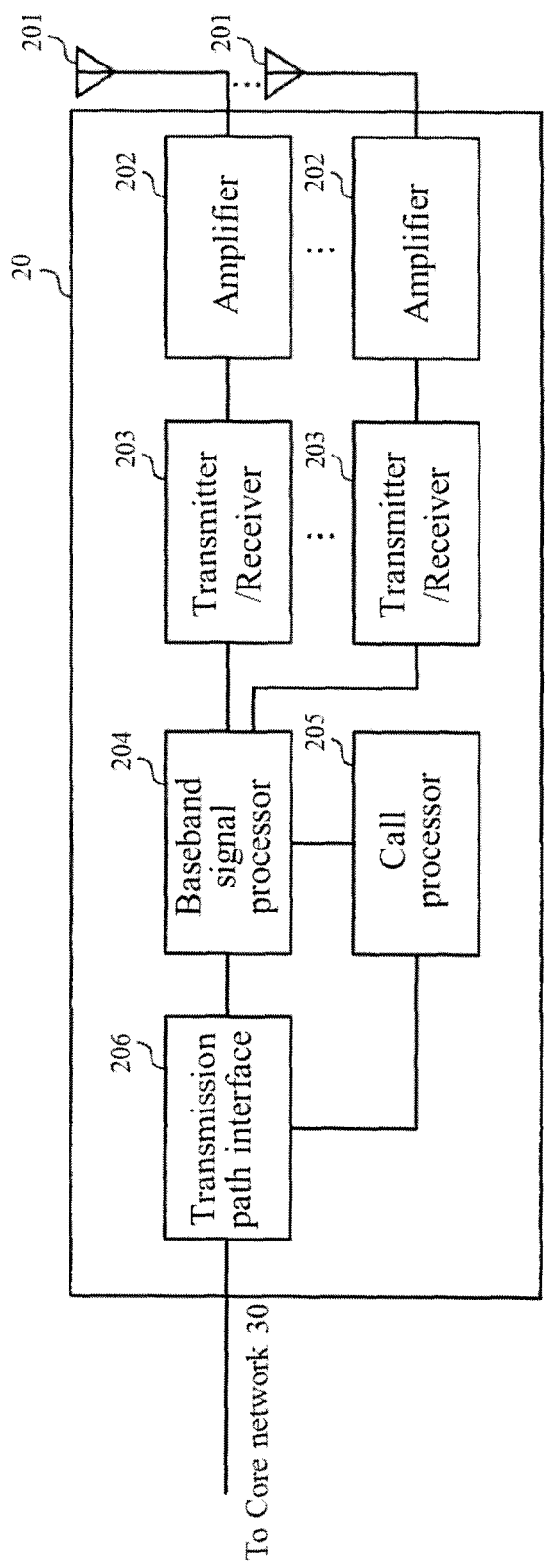
FIG. 23 is a diagram showing a schematic configuration of the TRP according to one or more embodiments of the present invention.

The TRP 20 according to one or more embodiments of the present invention will be described below with reference to FIG. 23. FIG. 23 is a diagram illustrating a schematic configuration of the TRP 20 according to one or more embodiments of the present invention. The TRP 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the TRP 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the TRP 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the TRP 20, and manages the radio resources.

(Configuration of UE)

Figure 24:
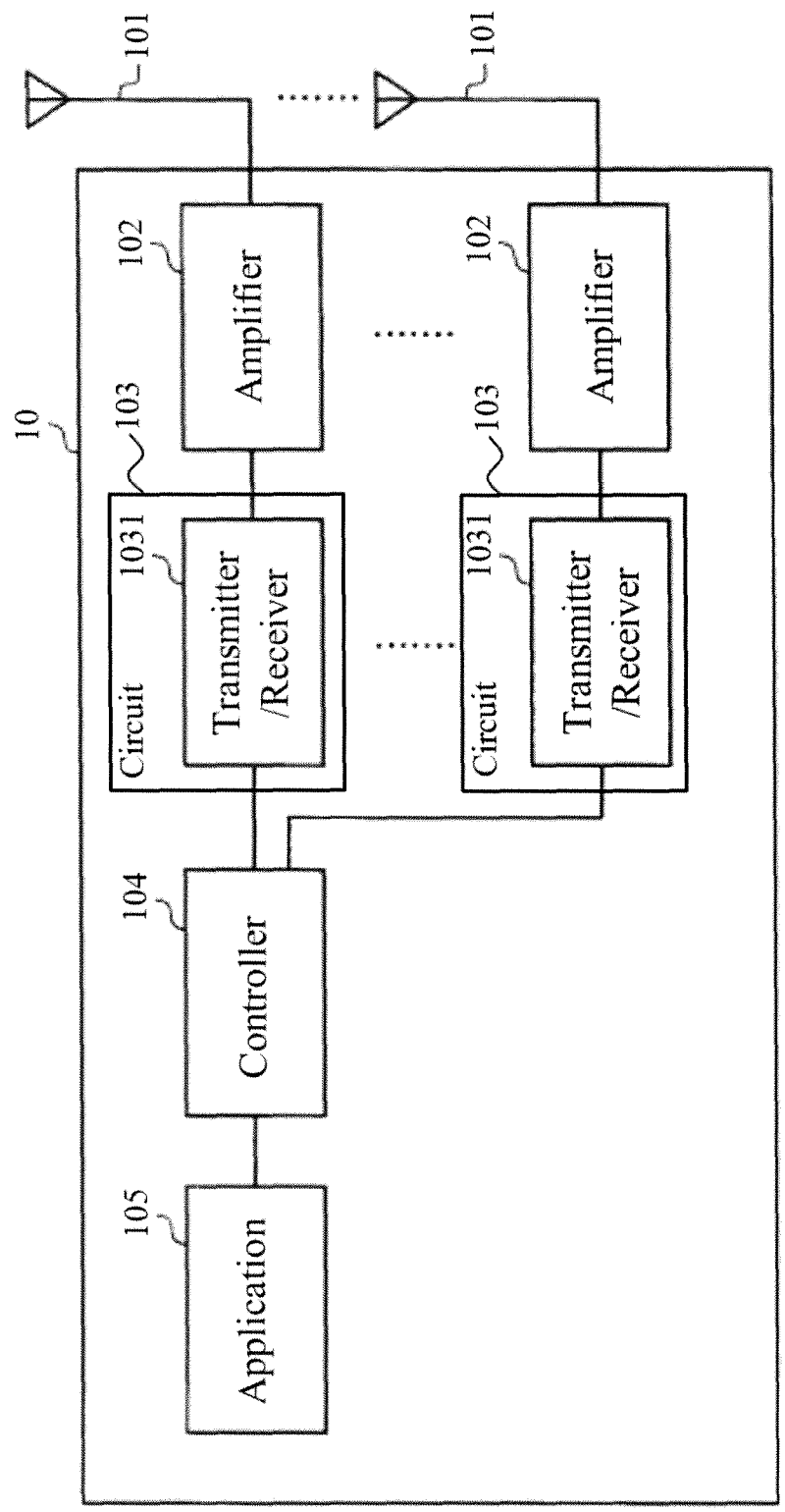
FIG. 24 is a diagram showing a schematic configuration of the UE according to one or more embodiments of the present invention.

The UE 10 according to one or more embodiments of the present invention will be described below with reference to FIG. 24. FIG. 24 is a schematic configuration of the UE 10 according to one or more embodiments of the present invention. The UE 10 has a plurality of UE antennas 101, amplifiers 102, the circuit 103 comprising transceiver (transmitter/receiver) 1031, the controller 104, and an application 105.

As for DL, radio frequency signals received in the UE antennas 101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

One or more embodiments of the present invention may be used for each of the uplink and the downlink independently. One or more embodiments of the present invention may be also used for both of the uplink and the downlink in common.

Although the present disclosure individually described the technology targeting for TRP Tx beam selection, TRP Rx beam selection, UE Tx beam selection, UE Rx beam selection, Joint TRP Tx and UE Rx selection, Joint UE Tx and TRP Rx beam selection, applicability of the technologies are not limited to each of the beam selection technology but open to other types of beam selection.

Although the present disclosure mainly described examples of a channel and signaling scheme based on NR, the present invention is not limited thereto. One or more embodiments of the present invention may apply to another channel and signaling scheme having the same functions as NR such as LTE/LTE-A and a newly defined channel and signaling scheme.

Although the present disclosure mainly described examples of channel estimation and CSI feedback scheme based on the CSI-RS, the present invention is not limited thereto. One or more embodiments of the present invention may apply to another synchronization signal, reference signal, and physical channel such as synchronization signal (SS), measurement RS (MRS), mobility RS (MRS), and beam RS (BRS).

Although the present disclosure mainly described examples of an uplink channel estimation method based on the SRS, the present invention is not limited thereto. One or more embodiments of the present invention may apply to another synchronization signal, reference signal, and physical channel.

Although the present disclosure mainly described examples of various signaling methods, the signaling according to one or more embodiments of the present invention may be explicitly or implicitly performed.

Although the present disclosure mainly described examples of various signaling methods, the signaling according to one or more embodiments of the present invention may be the higher layer signaling such as the RRC signaling and/or the lower layer signaling such as the DCI and the MAC CE. Furthermore, the signaling according to one or more embodiments of the present invention may use a Master Information Block (MIB) and/or a System Information Block (SIB). For example, at least two of the RRC, the DCI, and the MAC CE may be used in combination as the signaling according to one or more embodiments of the present invention.

Although the present disclosure described examples of the beamformed RS (RS transmission using the beam), whether the physical signal/channel is beamformed may be transparent for the UE. The beamformed RS and the beamformed signal may be called the RS and the signal, respectively. Furthermore, the beamformed RS may be referred to as a RS resource. Furthermore, the beam selection may be referred to as resource selection. Furthermore, the Beam Index may be referred to as a resource index (indicator) or an antenna port index.

One or more embodiments of the present invention may apply to CSI measurement, channel sounding, beam management, and other beam control scheme such as beam management using the SS.

In one or more embodiments of the present invention, the RB and a subcarrier in the present disclosure may be replaced with each other. A subframe, a symbol, and a slot may be replaced with each other.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A user equipment (UE) comprising:
a receiver that receives, using at least one second beam, at least one reference signal (RS) transmitted using a first beam from a base station (BS), the second beam being a reception (Rx) beam;
a processor that determines the first beam paired with the second beam based on reception quality of the RS; and
a transmitter that transmits a feedback information indicating the determined first beam,
wherein the feedback information indicates the second beam paired with the first beam,
wherein the receiver receives an Rx beam designation information indicating the second beam for receiving the RS from the BS, the Rx beam designation information including information about quasi-colocation (QCL),
wherein the information about QCL relates to a QCL type,
wherein the processor determines the second beam for receiving the RS based on the Rx beam designation information including the information about QCL and the QCL type, and
wherein the information about QCL is transmitted from the BS to the UE for each BS transmission (Tx) beam group.

2. The UE according to claim 1, wherein the receiver switches the second beam for each of a plurality of RSs.

3. The UE according to claim 1, wherein the receiver receives, from the BS, information indicating a number of the first beam.

4. A base station (BS) comprising:
a transmitter that transmits, to a user equipment (UE), at least one reference signal (RS) using a first beam; and
a receiver that receives a feedback information indicating the first beam paired with a second beam, the first beam being determined based on reception quality of the RS received using the second beam in the UE, the second beam being a reception (Rx) beam,
wherein the feedback information indicates the second beam paired with the first beam,
wherein the transmitter transmits an Rx beam designation information indicating the second beam for receiving the RS by the UE, the Rx beam designation information including information about quasi-colocation (QCL),
wherein the second beam for receiving the RS is determined by the UE based on the Rx beam designation information including the information about QCL and a QCL type,
wherein the transmitter transmits the information about QCL to the UE for each BS transmission (Tx) beam group, and
wherein the information about QCL relates to the QCL type.

5. A radio communication method for a user equipment (UE), comprising:
receiving, using at least one second beam, at least one reference signal (RS) transmitted using a first beam from a base station (BS), the second beam being a reception (Rx) beam;
determining the first beam paired with the second beam, based on reception quality of the RS; and
transmitting a feedback information indicating the determined first beam, wherein the feedback information indicates the second beam paired with the first beam;
receiving an Rx beam designation information indicating the second beam for receiving the RS from the BS, the Rx beam designation information including information about quasi-colocation (QCL), wherein the information about QCL relates to a QCL type; and
determining the second beam for receiving the RS based on the Rx beam designation information including the information about QCL and a QCL type,
wherein the information about QCL is transmitted from the BS to the UE for each BS transmission (Tx) beam group, and
wherein the information about QCL relates to the QCL type.

6. A system comprising a user equipment (UE) and a base station (BS), wherein
the UE comprises:
a first receiver that receives, using at least one second beam, at least one reference signal (RS) transmitted using a first beam from the BS, the second beam being a reception (Rx) beam;

a processor that determines the first beam paired with the second beam, based on reception quality of the RS; and a first transmitter that transmits a feedback information indicating the determined first beam, wherein the first receiver receives an Rx beam designation information indicating the second beam for receiving the RS from the BS, the Rx beam designation information including information about quasi-colocation (QCL), wherein the processor determines the second beam for receiving the RS based on the Rx beam designation information including the information about QCL and a QCL type, wherein the information about QCL is transmitted from the BS to the UE for each BS transmission (Tx) beam group, and wherein the information about QCL relates to the QCL type, and the BS comprises:

a second transmitter that transmits, to the UE, the at least one RS using the first beam; and a second receiver that receives the feedback information, wherein the second transmitter transmits the Rx beam designation information, wherein the feedback information indicates the second beam paired with the first beam, and wherein the second transmitter transmits the information about QCL to the UE for each BS Tx beam group.

* * * * *